(12) United States Patent
Aoki et al.

(10) Patent No.: US 8,049,901 B2
(45) Date of Patent: Nov. 1, 2011

(54) MEASURING DEVICE AND MEASURING METHOD

(75) Inventors: Hiroshi Aoki, Yokohama (JP); Koichiro Komatsu, Niiza (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/457,198

(22) Filed: Jun. 3, 2009

(65) Prior Publication Data

US 2009/0237677 A1 Sep. 24, 2009

Related U.S. Application Data

(63) Continuation of application No. PCT/JP2007/001372, filed on Dec. 7, 2007.

(30) Foreign Application Priority Data

Dec. 13, 2006 (JP) .................................. 2006-335971
Jan. 24, 2007 (JP) .................................. 2007-014246

(51) Int. Cl.
    *G01N 21/00* (2006.01)
(52) U.S. Cl. ...................... 356/601; 356/626; 356/241.1
(58) Field of Classification Search .... 356/241.1–241.6, 356/601, 626
See application file for complete search history.

(56) References Cited

U.S. PATENT DOCUMENTS

| 4,305,661 A | 12/1981 | Pryor et al. |
| 4,815,845 A | 3/1989 | Colbaugh et al. |
| 2008/0259346 A1 | 10/2008 | Strahle |

FOREIGN PATENT DOCUMENTS

| JP | A-55-154405 | 12/1980 |
| JP | A-03-115912 | 5/1991 |
| JP | A-06-337215 | 12/1994 |
| JP | A-08-233545 | 9/1996 |
| JP | A-2000-258141 | 9/2000 |
| JP | A-2006-038820 | 2/2006 |

*Primary Examiner* — Michael P Stafira

(74) *Attorney, Agent, or Firm* — Oliff & Berridge, PLC

(57) ABSTRACT

A measuring device includes a light-sending part sending light in a first direction which is a depth direction of a hollow shape, a conversion part converting a direction of the light into a circumference direction approximately orthogonal to the first direction, a detection part detecting light reflected inside a measuring object, the direction of which is converted by the conversion part, and a shape measurement part measuring an inside shape of the measuring object by obtaining a shift from a reference position according to a detection result of the detection part. Thereby, it is possible to obtain the hollow shape of an object at one time without a need of rotating the object or a light source, and to carry out a highly accurate measurement using a simple device.

15 Claims, 16 Drawing Sheets

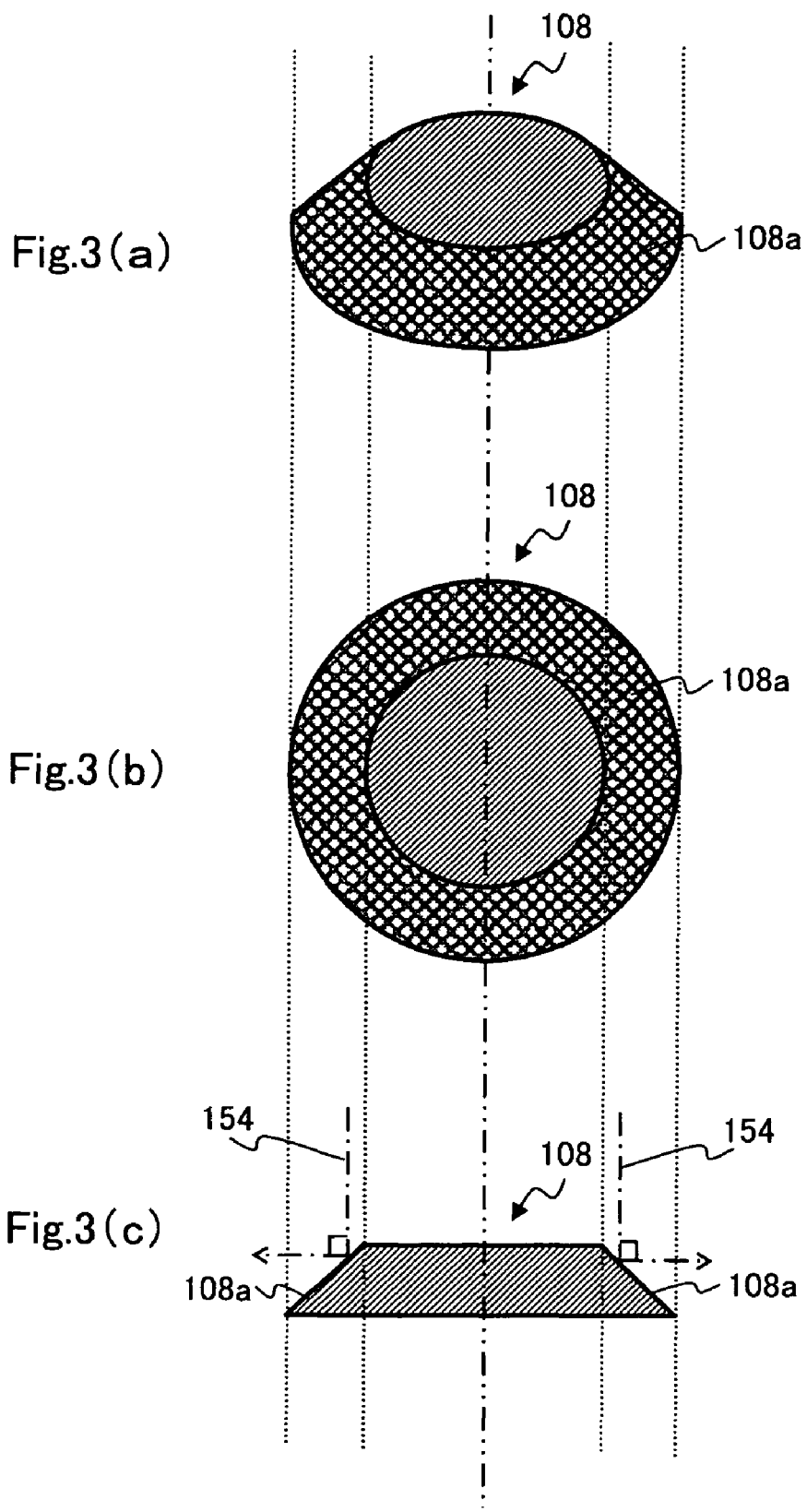

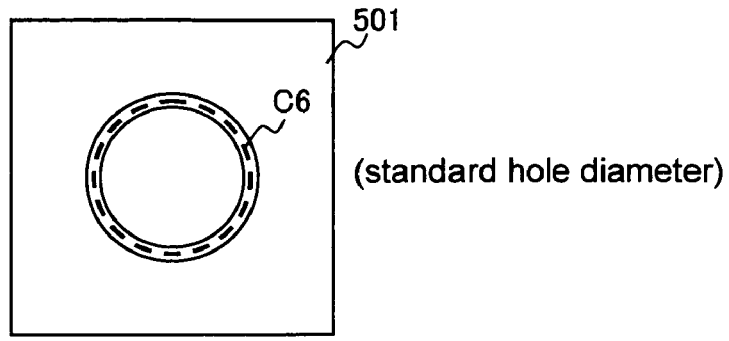
Fig. 6(a) (standard hole diameter)
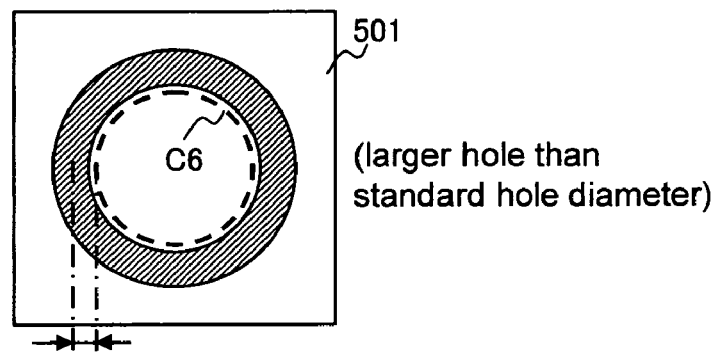
Fig. 6(b) (larger hole than standard hole diameter)
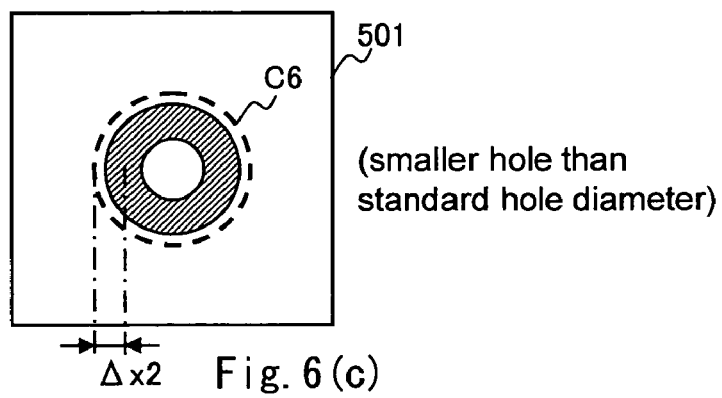
Fig. 6(c) (smaller hole than standard hole diameter)
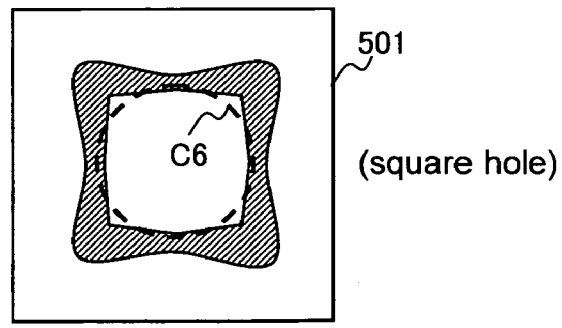
Fig. 6(d) (square hole)

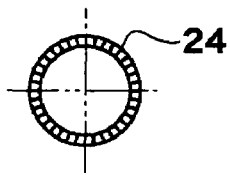
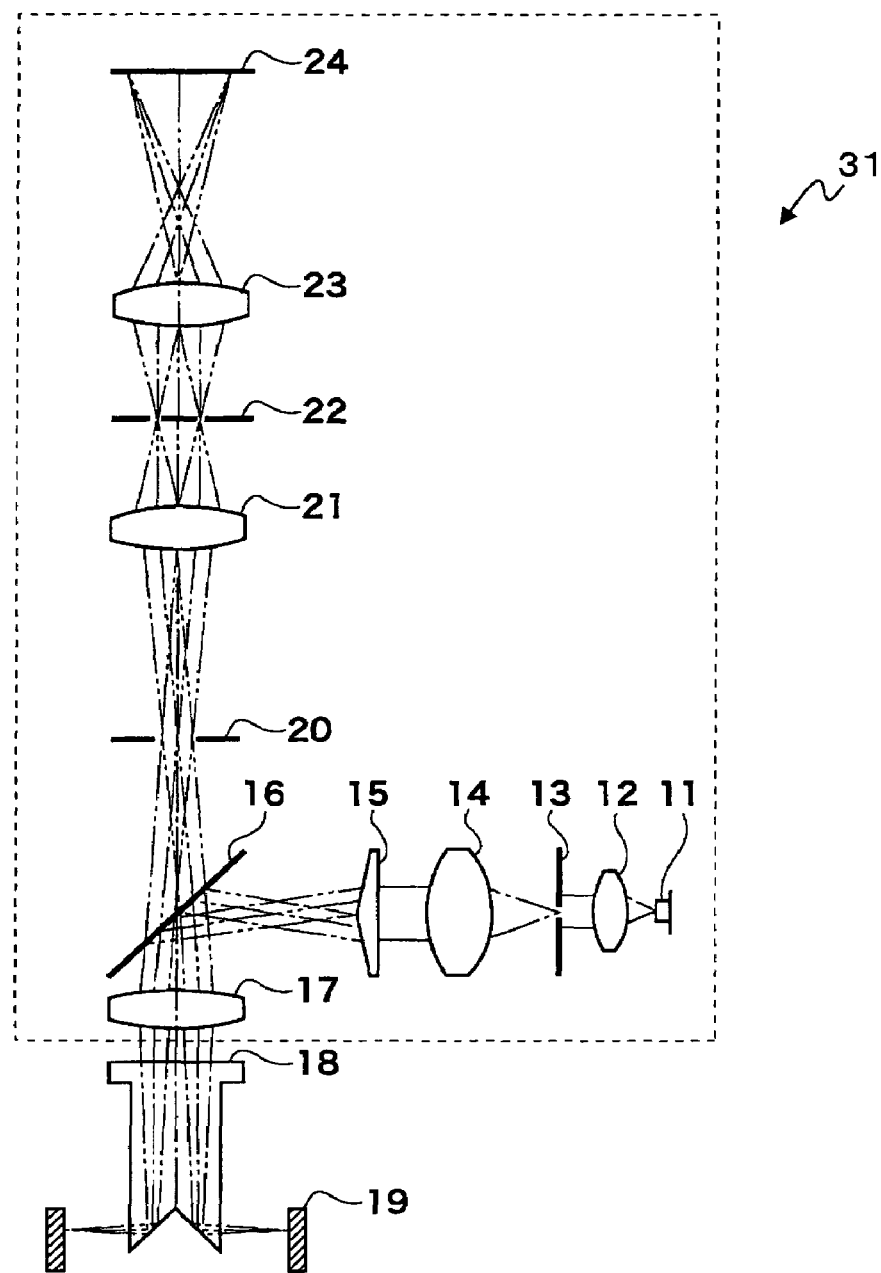
Fig. 16(b)
Fig. 16(a)

MEASURING DEVICE AND MEASURING METHOD

CROSS REFERENCE TO THE RELATED APPLICATIONS

This application is a continuation application of International Application PCT/JP2007/001372, filed Dec. 7, 2007, designating the U.S., and claims the benefit of priority from Japanese Patent Application Nos. 2006-335971, filed on Dec. 13, 2006, and 2007-014246, filed on Jan. 24, 2007, the entire contents of which are incorporate herein by reference.

BACKGROUND

1. Field

The present application relates to a measuring device and a measuring method measuring a hollow shape of an object.

2. Description of the Related Art

Conventionally, a distance sensing method or a grazing incidence optics system method has been known as a method for measuring a hollow shape of an object contactlessly. For example, the distance sensing method projects a laser light to the inside of a hollow shape, measures a shift of a reflected light while rotating an object, and measures the hollow shape of the object (e.g., refer to Patent Document 1: Japanese Unexamined Patent Application Publication No. 2006-38820).

Further, measurement of a hollow shape provided in a metal or the like is performed by a method of rotating and moving up-and-down a sensing pin station while putting a sensing pin to the inside surface of the hollow shape using a sensing pin method three-dimensional shape measuring device (e.g., refer to Patent Document 2: Japanese Unexamined Patent Application Publication No. H6-337215).

Alternatively, a method, which detects edges corresponding to both ends of a diameter by a slit optical projection method, is known as a device for measuring a hollow shape without contact (e.g., refer to Patent Document 3: Japanese Unexamined Patent Application Publication No. H8-233545).

The conventional distance sensing method cannot obtain circumference shape information of a hollow shape of an object at one time and requires rotation of the object or a light source, which makes the device complicated and also causes a problem in accuracy.

Further, the method of moving the sensing pin station has a problem of requiring a long measurement time because of the required rotation and up-and-down movement of the sensing pin for measuring the whole hollow shape, and also a problem of possibly causing an error by an effect of eccentricity or deflection in the rotation of the sensing pin station.

Still further, the slit optical projection method requires a slit to be disposed so as to be orthogonal against a measurement direction, and has a problem that the method is not suitable for obtaining a shape by measuring in many directions, since only one direction is measured at one-time. Further, there is also a restriction that the hollow shape of the measuring object should be a through-hole.

The embodiments of the present invention aim at providing a measuring device and a measuring method measuring a hollow shape in a high accuracy with little error with a simple configuration and without a complicated computation.

SUMMARY

A measuring device is one which measures an inside shape of a hollow measuring object, and includes a light-sending part sending light in a first direction which is a depth direction of the hollow shape, a conversion part converting a direction of the light into a direction approximately orthogonal to the first direction, a detection part detecting the light reflected inside the measuring object, the direction of which is converted by the conversion part, and a shape measurement part measuring the inside shape of the measuring object by obtaining a shift from a predetermined reference position according to a detection result of the detection part.

Further, the measuring device includes a movement part moving a measurement optical system including the light-sending part, the conversion part, and the detection part, and the measuring object relatively in the first direction, in which the shape measurement part measures the inside shape of the measuring object according to the detection result of the detection part when relative positions of the measuring object and the conversion part are changed.

Still further, the conversion part converts the direction of the light sent by the light-sending part toward circumference in the direction approximately orthogonal to the first direction.

Moreover, the light-sending part includes a light source generating the light, a first optical system guiding the light from the light source and having a focus at the reference position, a first optical limiting material having an aperture of a predetermined shape and being disposed at a position conjugate with the focus of the first optical system on the light source side than the focus, and a second optical system causing the light returned from the measuring object to form an image, and a light receiving part includes the detection part being disposed at an imaging surface where an image of the measuring object at the reference position is formed by the second optical system, receives the light from the light source, and has a conjugate relation with the reference position.

Further, the measuring device includes a second optical limiting material having an aperture of a predetermined shape and shading a part of a light flux which is irradiated to the measuring object from the first optical limiting material.

Still further, the first optical limiting material is configured with a round slit.

Alternatively, the light-sending part also includes a light source generating the light, a first optical system guiding the light from the light source and having a focus at the reference position, and an optical material converting the light from the light source into ring-shaped light and condensing the light onto a predetermined position, a ring light flux generating optical system, such that a light ray at a middle position of a ring width in the ring light flux does not become parallel to a light axis of an optical system configured with the optical material, and a second optical system causing the light returned from the measuring object to form an image and a light receiving part includes the detection part being disposed at an imaging surface where an image of the measuring object at the reference position is formed by the second optical system, receives the light from the light source, and has a conjugate relation with the reference position.

Alternatively, the light-sending part includes a light source generating the light, a first optical system guiding the light from the light source and having a focus at the reference position, and an optical material converting the light from the light source into ring-shaped light and condensing the light onto a predetermined position, a ring light flux generating optical system, such that a light ray at a middle position of a ring width in the ring light flux does not become parallel to a light axis of an optical system configured with the optical material, and a second optical system causing the light returned from the measuring object to form an image and a light receiving part includes the detection part being disposed at an imaging surface where an image of the measuring object at the reference position is formed by the second optical system, receives the light from the light source via a ring-shaped slit, and has a conjugate relation with the reference position, and a movement means capable of changing a spacing between the conversion part and the other optical system and also measuring the spacing, in a state of fixing the conversion part.

Further, the ring light flux generating optical system includes a collector lens forming the light from the light source into parallel light and an axicon lens converting the parallel light into ring-shaped light flux.

Still further, the light-sending part is disposed at the position for sending the light in the direction different from the first direction, and a half mirror is provided between the measuring object and the light-sending part to reflect the light sent from the light-sending part in the first direction and also to transmit the light returned from the measuring object to the light receiving part side.

In addition, the conversion part is configured with a conical shaped mirror.

Moreover, the conversion part performs reflection by total reflection.

Alternatively, the conversion part has a reflection part formed in a light transmissive material.

A measuring method is one which measures an inside shape of a hollow measuring object, and includes the steps of converting a direction of light sent by a light-sending part in a first direction into a circumference direction approximately orthogonal to the first direction by a conversion part and irradiating an inside of the measuring object with the light and measuring an inside shape of the measuring object by obtaining a shift from a predetermined reference position according to a detection result of the light reflected inside the measuring object by a detection part.

Further, the method includes the step of measuring the inside shape of the measuring object by performing the detection while moving the measuring object and the conversion part relatively in the first direction.

Alternatively, the measuring method which measures an inside shape of a hollow measuring object includes the steps of converting a direction of a ring-shaped light flux sent by a light-sending part in a first direction into a circumference direction approximately orthogonal to the first direction by a conversion part inserted in the measuring object and irradiating an inside of the measuring object with the light flux forming an image of reflected light from the side thereof via the conversion part onto a ring-shaped slit disposed at a position conjugate with the reference position by a light receiving optical system, and receiving the light passing through the ring-shaped slit with a light receiving part while changing a spacing between the conversion part and the other optical system in a state of fixing the conversion part and measuring an inside shape of the measuring object from a relationship between an output value of the light receiving part and a value of the spacing.

The embodiments of the present invention can measure the inside shape of the hollow measuring object with a simple configuration and without a complicated computation.

BRIEF DESCRIPTION OF THE DRAWINGS

FIGS. 3(a), 3(b) and 3(c) are configuration diagrams of a conical shaped mirror 108 in the hollow shape measuring device 101.

FIGS. 6(a), 6(b), 6(c) and 6(d) are auxiliary diagrams for illustrating a principle of the hollow shape measuring device 101.

FIGS. 16(a) and 16(b) are diagrams showing an outline of an optical system in a hollow shape measuring device 31 which is a third embodiment of the present invention.

DETAILED DESCRIPTION OF THE EMBODIMENTS

Hereinafter, each embodiment of the present invention will be described in detail with reference to the drawings.

First Embodiment

Figure 1:
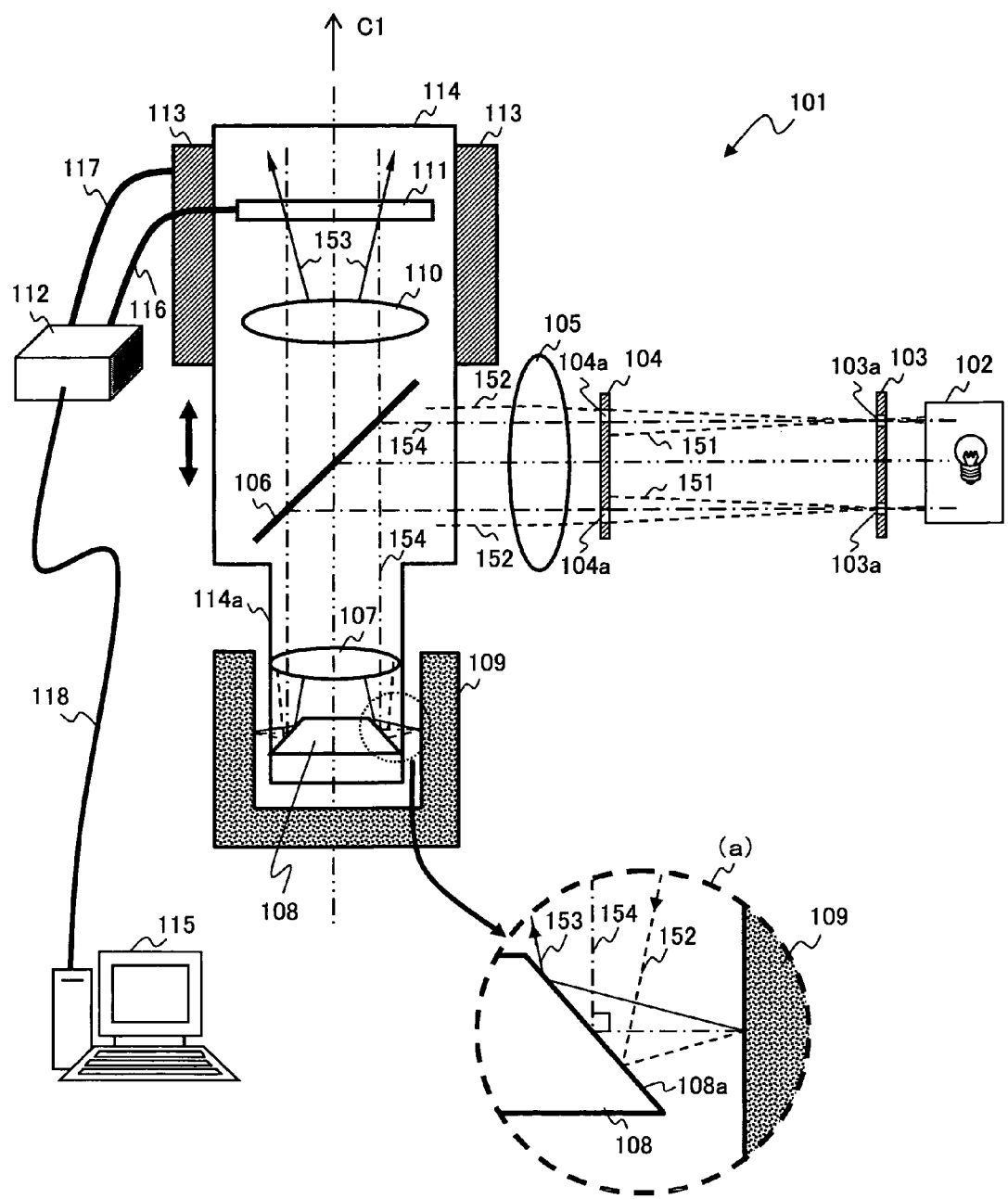
FIG. 1 is a configuration diagram of a hollow shape measuring device 101 according to a first embodiment.

FIG. 1 is a block diagram of a hollow shape measuring device 101 according to a first embodiment. The hollow shape measuring device 101 is a device measuring an inside shape of a hollow object at each predetermined height to obtain a cross-sectional shape and forming the hollow shape of the object 3-dimensionally by combining the obtained cross-sectional shapes in a height direction.

The hollow shape measuring device 101 is configured with a light-sending part 102, a round slit 103, an optical limiting slit 104, a lighting lens 105, a half mirror 106, an objective lens 107, a conical shaped mirror 108, an image formation lens 110, an imaging part 111, an image processing part 112, a z-axis driving part main body 113, a movement part 114, and a personal computer 115.

The movement part 114 is a member supporting the half mirror 106, the objective lens 107, the conical shaped mirror 108, the image formation lens 110, and the imaging part 111 in an integrated manner, and a portion thereof, where light from the light-sending part 102 enters the half mirror 106, and a head portion 114*a* of the movement part 114, which is located in a circumference direction of the conical shaped mirror 108 and inserted into the inside of a measuring object 109, are made of transparent material such as glass. Further, the movement part 114 is driven upward and downward in a direction of a center axis C1 by the z-axis driving part main body 113 fixed to a basement (not shown in the drawing) and measures the inside shape of the measuring object 109 by putting or taking the head portion 114*a* of the movement part 114 into or out of the hollow part of the measuring object 109. Note that the light-sending part 102, the round slit 103, the optical limiting slit 104, the lighting lens 105, the half mirror 106, the objective lens 107, the conical shaped mirror 108, the image formation lens 110, and the imaging part 111 are integrated with the movement part 114 to form a measurement optical system and move upward or downward.

The light emitted from the light-sending part 102 passes through a slit 103*a* of the round slit 103 corresponding to a field stop and enters the optical limiting slit 104. When the light flux passes through the optical limiting slit 104, a half of the light flux (e.g., inside light flux 151 having a center at a dashed-dotted line 154 indicating a center of the light flux) is shaded and is not output to the side of the lighting lens 105.

Figure 2A:
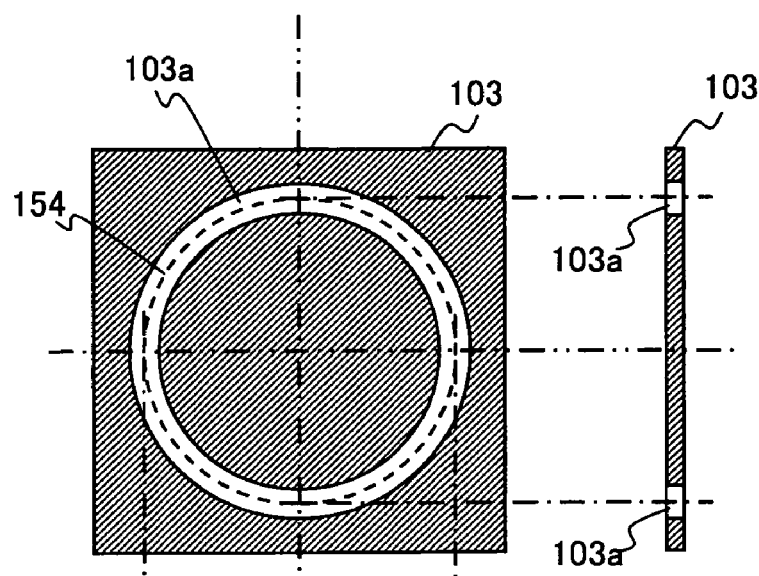
FIGS. 2(a) and 2(b) are configuration diagrams of a round slit 103 and an optical limiting slit 104, respectively, in the hollow shape measuring device 101.
Figure 2B:
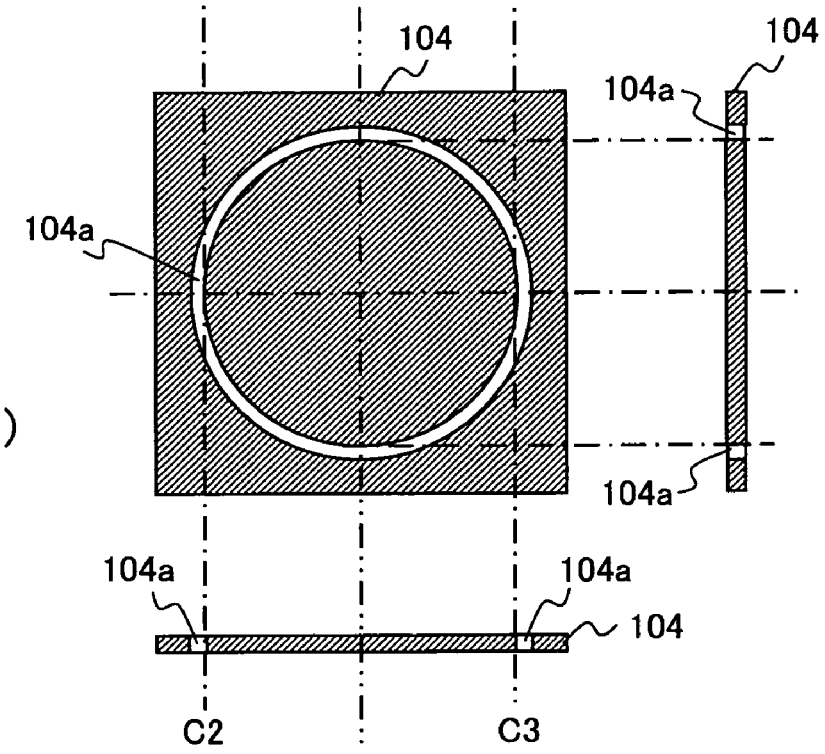

Here, shapes of the round slit 103 and the optical limiting slit 104 are explained in detail using FIGS. 2(*a*) and 2(*b*). The round slit 103 shown in FIG. 2(*a*) is provided with the slit 103*a* which transmits the light emitted from the light-sending part 102 in a ring shape. Here, the ring-shaped slit 103*a* is disposed such that the dashed-dotted line 154 indicating the center of the light flux in FIG. 1 is positioned at the center of the round slit 103.

Meanwhile, the optical limiting slit 104 shown in FIG. 2(*b*) is provided with a ring-shaped slit 104*a* which shades a half of the light flux having been transmitted through the round slit 103 and transmits the remaining half. A feature of the optical limiting slit 104 is that the ring-shaped slit 104*a* transmits only an outer half of the light flux, since an inside diameter of the ring-shaped slit 104*a* corresponds to the position of the dashed-dotted line 154 indicating the center of the light flux as shown by dashed-dotted lines C2 and C3. Note that the round slit 103 and the optical limiting slit 104 are realized by use of a liquid crystal panel, for example, in which liquid crystal is controlled so as to transmit the light in a ring shape. Alternatively, the round slit 103 and the optical limiting slit 104 may be realized by a method of depositing a shading portion onto a glass plate or the like, or of etching a transmitting portion, or other method. Further, sensitivity of the imaging part 111 changes according to a shading ratio.

The light, a half of the light flux of which is shaded by the optical limiting slit 104, enters the half mirror 106 through the lighting lens 105. The half mirror 106 converts the direction of the incident light and reflects the light to the side of the objective lens 107. Here, the direction of the light reflected by the half mirror 106 is the depth direction of the measuring object (axial direction in a case of a cylindrical shape), and when this direction is defined as a first direction, the light reflected by the half mirror 106 in the first direction is sent to the conical shaped mirror 108 via the objective lens 107 and irradiated horizontally toward the inside of the measuring object 109 by the conical shaped mirror 108 in the circumference direction approximately orthogonal to the first direction. The light irradiated horizontally is reflected by the inside of the measuring object 109 and again enters the conical shaped mirror 108, and, after reflected to the side of the objective lens 107, the light forms an image on the light receiving surface of the imaging part 111 through the half mirror 106 and the image formation lens 110. Note that the light receiving surface of the imaging part 111, the round slit 103 composing the field stop, and a reference position where the measuring object is placed are located at optical conjugate positions and images are focused at these three positions. Further, the ring center of the ring-shaped light flux reflected by the half mirror 106 and the center of the conical shaped mirror 108 coincide with each other.

Here, the shape of the conical shaped mirror 108 will be described using FIGS. 3(*a*), 3(*b*) and 3(*c*). FIG. 3(*a*) is a perspective view of the conical shaped mirror 108, and FIGS. 3(*b*) and 3(*c*) show a plane view and a side view, respectively. The dashed-dotted line 154 indicating the center of light flux reflected by the half mirror 106 in the first direction is reflected in a direction approximately orthogonal to the first direction by a mirror portion 108*a* slanted toward the outside of the conical shaped mirror 108 and irradiated toward the inside of the measuring object 109 for irradiation. This state is illustrated in detail in FIG. 1(*a*). The light flux transmitted without being shaded by the optical limiting slit 104 exists between the dashed-dotted line 154 which indicates the center of the light flux and a dotted line 152 which indicates the outside of the light flux, for example, and is reflected by the mirror portion 108*a* of the conical shaped mirror 108. Further, the dotted line 152 indicating the outside of the light flux is reflected by the measuring object 109 and is reflected again by the conical shaped mirror 108 in the direction of the objective lens 107 as shown by a solid line 153. That is, the returning light flux reflected by the inside of the measuring object 109 still has the shaded half and exists between the dashed-dotted line 154 which indicates the center of the light flux and the solid line 153 which indicates the outside of the light flux.

Figure 4:
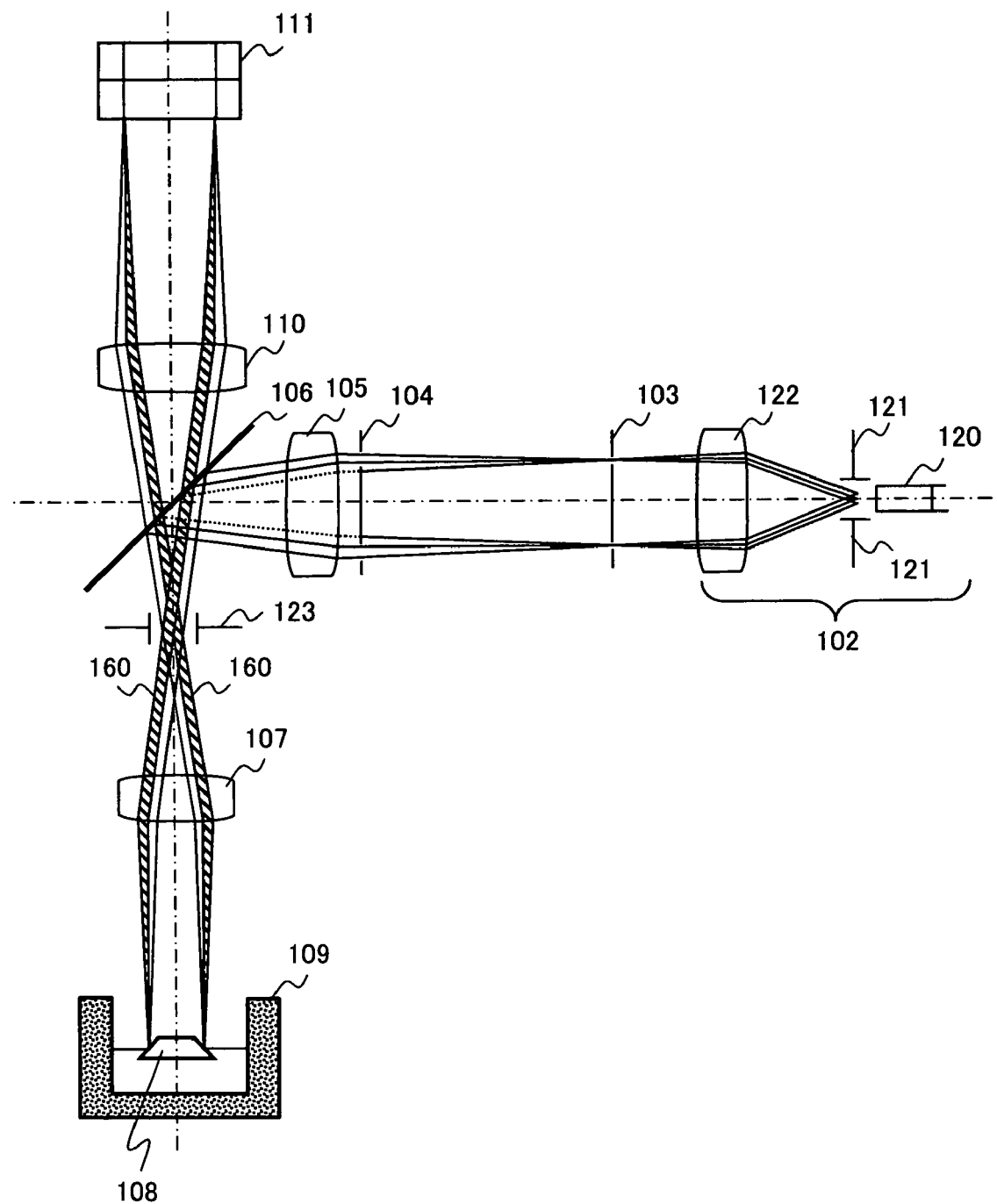
FIG. 4 is an auxiliary diagram showing an optical system in the hollow shape measuring device 101.

This state will be described using FIG. 4. FIG. 4 is a diagram illustrating an optical configuration of the hollow shape measuring device 101 of FIG. 1, and the same symbol as that in FIG. 1 indicates the same element. The light-sending part 102 includes a light source 120, an aperture stop 121 which determines an illumination Numerical Aperture (NA), a lens 122 which condenses the light from the light source 120 and makes the light parallel to the light axis, and an image formation stop 123 which determines a receiving side NA. Note that, as described above, the light receiving surface of the imaging part 111, the round slit 103 composing the field stop, and the area of the measuring object 109 at the reference position is shown to be located at optical conjugate positions and the images are shown to be focused at these three positions. In FIG. 4, since the optical limiting slit 104 shades a half of the light flux, the half of the light flux returning from the measuring object 109 is shaded and does not enter the imaging part 111.

Next, an image of a dot, which composes the image formed on the light receiving surface of the imaging part 111, will be described using FIGS. 5(*a*) and 5(*b*). FIG. 5(*a*) is a diagram showing a state when a certain point inside the measuring object 109 is shot by the imaging part 111 without the optical limiting slit 104, and illustrates broadening of the light flux, that is, change of a focus shift (image blur) in the imaging part 111 when the hole diameter is changed at the measurement position. Here, while the focus shifts depend on the inside diameter of the measuring object 109, the inside diameter at a position where the image is focused correctly is defined as a standard hole diameter and the optical system of the hollow shape measuring device 101 is assumed to be corrected such that the image is focused correctly at this standard hole diameter.

Symbols 451 and 451*a* to 451*f* of FIG. 5(*a*) show the images captured by the imaging part 111, and the part indicated by the straight line 401 shows a case of the standard hole diameter, while the hole diameter becomes larger toward the top of the page from the straight line 401 and adversely becomes smaller toward the bottom of the page. For example, the image blur does not occur as in the light flux 451 when the standard hole diameter is shot, but the light flux broadens like the light fluxes 451a, 451b and 451c as the hole diameter becomes larger than the standard hole diameter. Similarly, the light flux broadens like the light fluxes 451d, 451e, and 451f as the hole diameter becomes smaller than the standard hole diameter. That is, the broadening amount of the light flux enables the measurement of a magnitude of the shift from the standard hole diameter. However, since the light flux broadening at this time shows a similar broadening of the light flux on both sides of the axis C4, which passes through the focus position of the standard hole diameter, when the hole diameter becomes either smaller or larger, it is not possible in this situation to determine whether the hole diameter becomes larger or smaller.

Figure 5A:
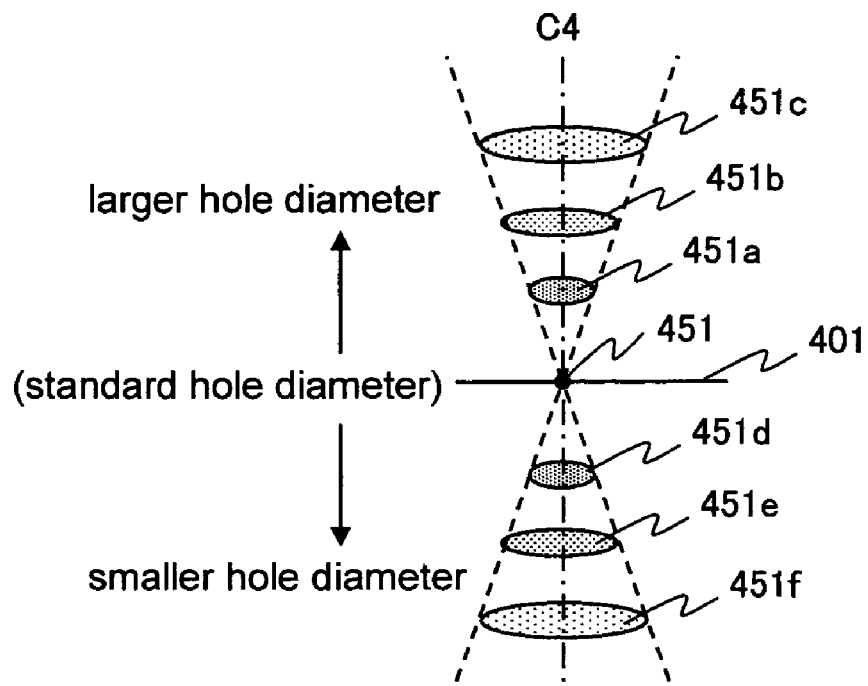
FIGS. 5(a) and 5(b) are auxiliary diagrams for illustrating a principle of the hollow shape measuring device 101.
Figure 5B:
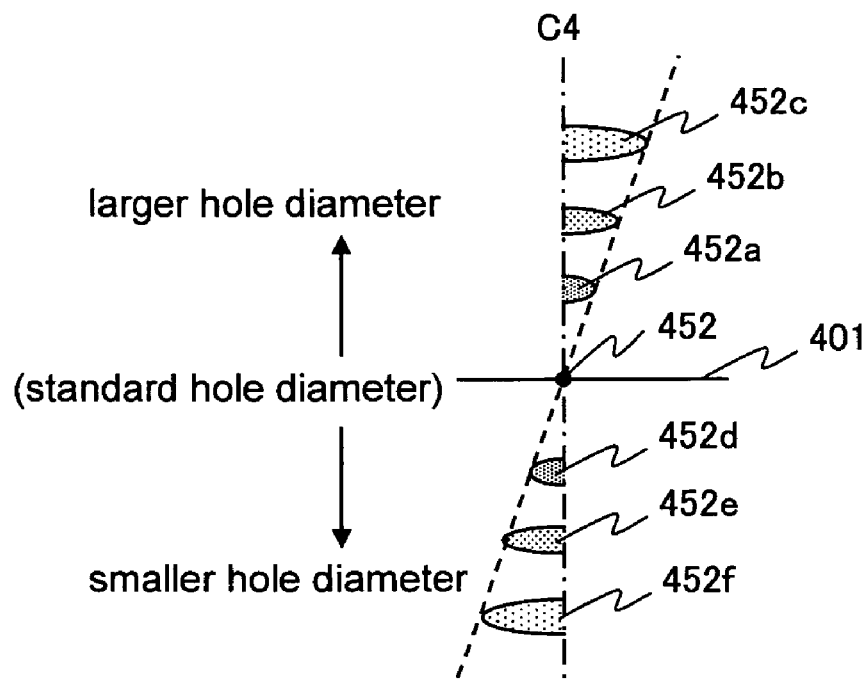

On the other hand, the present embodiment employs the optical limiting slit 104 which shades a half of the light flux irradiating the measuring object 109, and thereby the change of the light flux broadening becomes as shown in FIG. 5(b) when the hole diameter is changed. In the drawing, while the image blur does not occur as in the light flux 452 when the standard hole diameter is shot, the light flux broadens like the light fluxes 452a, 452b, and 452c as the hole diameter becomes larger than the standard hole diameter. Similarly, the light flux broadens like the light fluxes 452d, 452e, and 452f as the hole diameter becomes smaller than the standard hole diameter. However, differently from the case of FIG. 5(a), the light fluxes 452a, 452b, and 452c broaden only in the right direction of the page from the axis C4, and similarly the light fluxes 452d, 452e, and 452f broaden only in the left direction of the page from the axis C4. That is, it is possible to determine whether the hole diameter of the measuring object 109 becomes larger or smaller than the standard hole diameter, according to whether the light flux shifts in the right or left direction of the page from the axis C4. The image processing part 112 measures the magnitude of the shift from the standard hole diameter from this determination result and the broadening amount of the light flux, and can obtain how much the inside shape of the measuring object 109 is larger or smaller against the standard hole diameter.

While FIGS. 5(a) and 5(b) illustrate the state of the light flux having formed an image on the light receiving surface of the imaging part 111, FIGS. 6(a), 6(b), 6(c) and 6(d) illustrate how the captured image changes depending on the hollow shape of the measuring object 109. FIGS. 6(a), 6(b), 6(c) and 6(d) show all the states of the images formed on the light receiving surface 501 of the imaging part 111, and FIG. 6(a) shows the image when the standard hole diameter is measured and the image is formed at a part of the standard hole diameter position C6. Note that, while the image is illustrated having a wider width on both sides of the standard hole diameter position C6 in the drawing for easy understanding, actually the image overlaps the standard hole diameter position C6. FIG. 6(b) shows the image when the hollow shape larger than the standard hole diameter is measured, and the image has blur on the outer side of the standard hole diameter position C6. On the other hand, FIG. 6(c) shows the image when the hollow shape smaller than the standard hole diameter is measured, and the image has blur on the inner side of the standard hole diameter position C6. For example, when the measuring object 109 with a square inside shape which has a larger size and also a smaller size than the standard hole diameter position C6 is measured, the image shown in FIG. 6(d) is obtained.

In this manner, the image processing part 112, when having received image data of the image formed on the light receiving surface of the imaging part 111, determines whether the inside shape of the measuring object 109 is larger or smaller than the standard hole diameter, from the direction of the light flux broadening, and further can obtain the inside diameter (shape) of the measuring object 109 from the distance between the center or peak position of the broadened light flux and the standard hole diameter position C6. For example, the image processing part 112 obtains the hole diameter of the measuring object 109 by measuring the distance $\Delta x1$ between the peak position of the broadened light flux and the standard hole diameter position C6 in the case of FIG. 6(b), or by measuring the distance $\Delta x2$ in the case of FIG. 6(c). Further, it becomes possible to measure a complicated shape by combining the respective diameters (shapes) which are obtained by dividing the circumference range into small ranges (e.g., every one to two degrees). Note that in an actual measurement, it is preferable to prepare a conversion table of the distance $\Delta x$ and the actual hole diameter difference by preliminarily measuring the distance $\Delta x$, between the peak position of the broadened light flux and the standard hole diameter position C6, and the actual hole diameter difference, using a calibration tool the hole diameter of which, different from that of standard hole, is known.

Figure 7A:
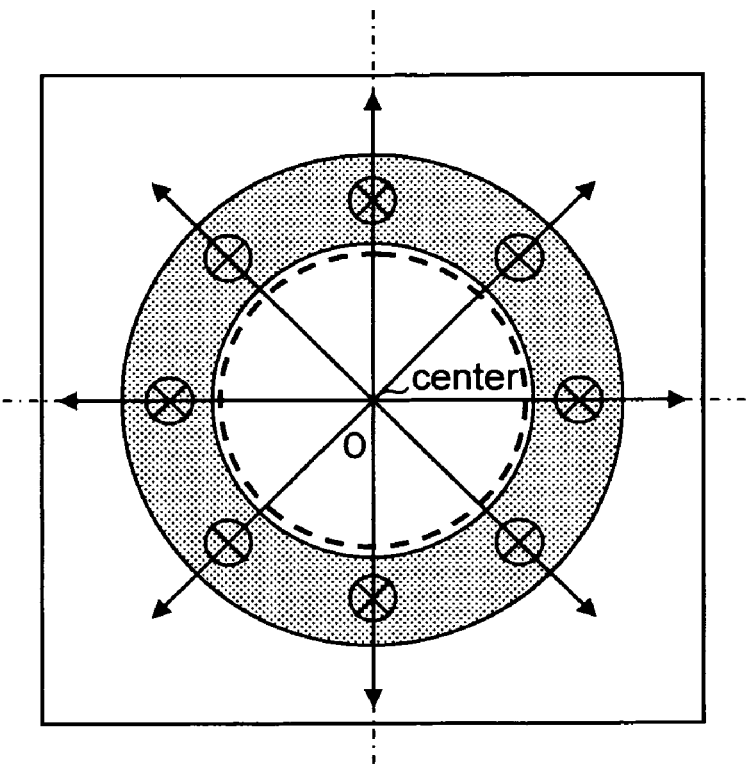
FIGS. 7(a) and 7(b) are auxiliary diagrams for illustrating a measurement principle.

Next, a cross-section measurement method will be described. FIG. 7(a) shows an optical ring forming an image on the light receiving surface. First, a temporary center is set at the center of the light receiving surface. Then, optical power is measured in a radial direction from the temporary center for each set angle. The optical power increases at a portion where the optical ring forms an image. A portion to be defined as the circumference of the ring is calculated from the optical amount distribution of this ring image.

Figure 7B:
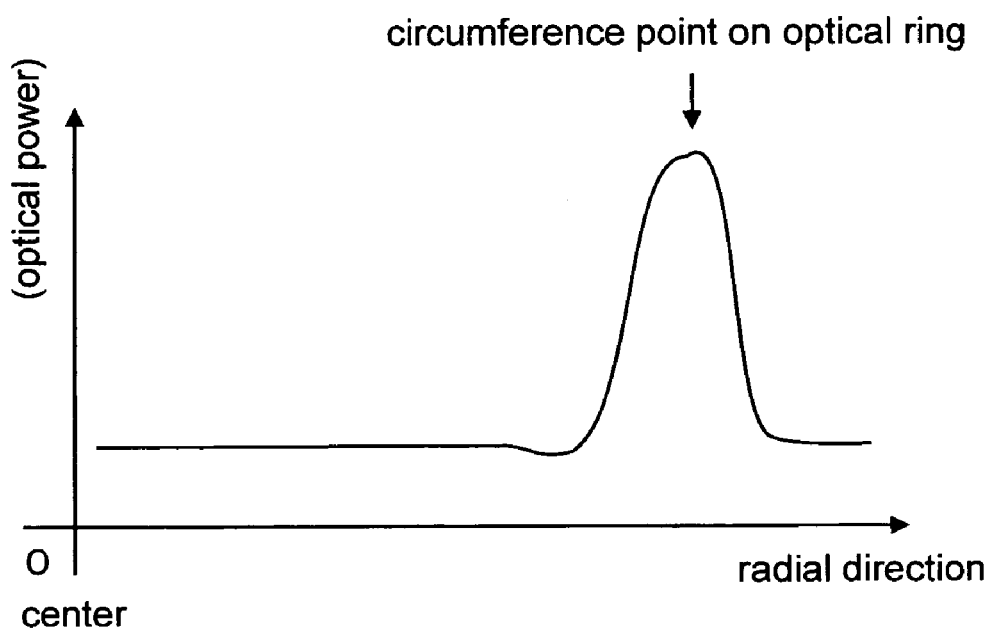

There are some methods for the defining, and the following methods can be employed, for example.
1) Optical amount peak method: method of fitting discrete data of the optical amount distribution in the neighborhood of the peak position in the ring profile into an approximation formula to calculate the peak position
2) Optical amount centroid method: method of calculating a centroid position of the optical amount distribution in the neighborhood of the peak position in the ring profile
3) Threshold value method: method of setting a threshold value at a level which is 30% darker, for example, than the peak value of the ring profile and calculating an intermediate position between the cross points of the threshold line and the profile For example, the circumference position in each direction will be obtained by the optical centroid method. FIG. 7(a) shows a case of the calculation in every 45 degrees and eight points are obtained for the circumference points of the optical ring shown in FIG. 7(b). Then, the size and the center of the optical ring are obtained from these points by use of a mathematical approach such as a least-square method. Further, it is possible to calculate the inside diameter of the measuring object directly from the size of the optical ring. It is also possible to calculate the difference from the standard ring size, as described above.

Moreover, when the actual optical ring center is considerably shifted from the predetermined temporary center, it is possible to measure the size of the optical ring more accurately, if the circumference position is calculated again in the radial direction from the optical ring center calculated in this process.

Further, the image processing part 112 transmits an instruction to the z-axis driving part main body 113 which is connected to the image processing part 112 via a cable 117, and moves up-and-down the movement part 114 supporting the conical shaped mirror 108 toward the imaging part 111 at a predetermined pitch. That is, the relative positions of the measurement optical system and the conical shaped mirror 108 are changed. Then, the image processing part 112 inputs the image data from the imaging part 111 at each predetermined position of the movement part 114, and obtains the inside shape of the measuring object at the predetermined position by processing the input image data as described above.

Here, a method will be described for optimizing the present device according to the hole diameter of the measuring object.

A measurement range of the present device is determined by a projection magnification ratio of the round slit 103 to the measuring object 109, a projection magnification ratio from the measuring object 109 to the imaging part 111, and the size of the imaging part 111. For example, the standard ring image formed at the imaging part 111 has a fixed size, and the ring image changes the size thereof while being blurred according to the inside diameter of the measuring object 109. When the inside diameter is too small, it becomes impossible to distinguish the image as a circle, and when the inside diameter is too large, the image becomes to exceed the size of the imaging part 111. For, example, when the conical shaped mirror 108 is located in the upper position shown in FIG. 8, it is impossible to measure the measuring object 109.

Figure 8:
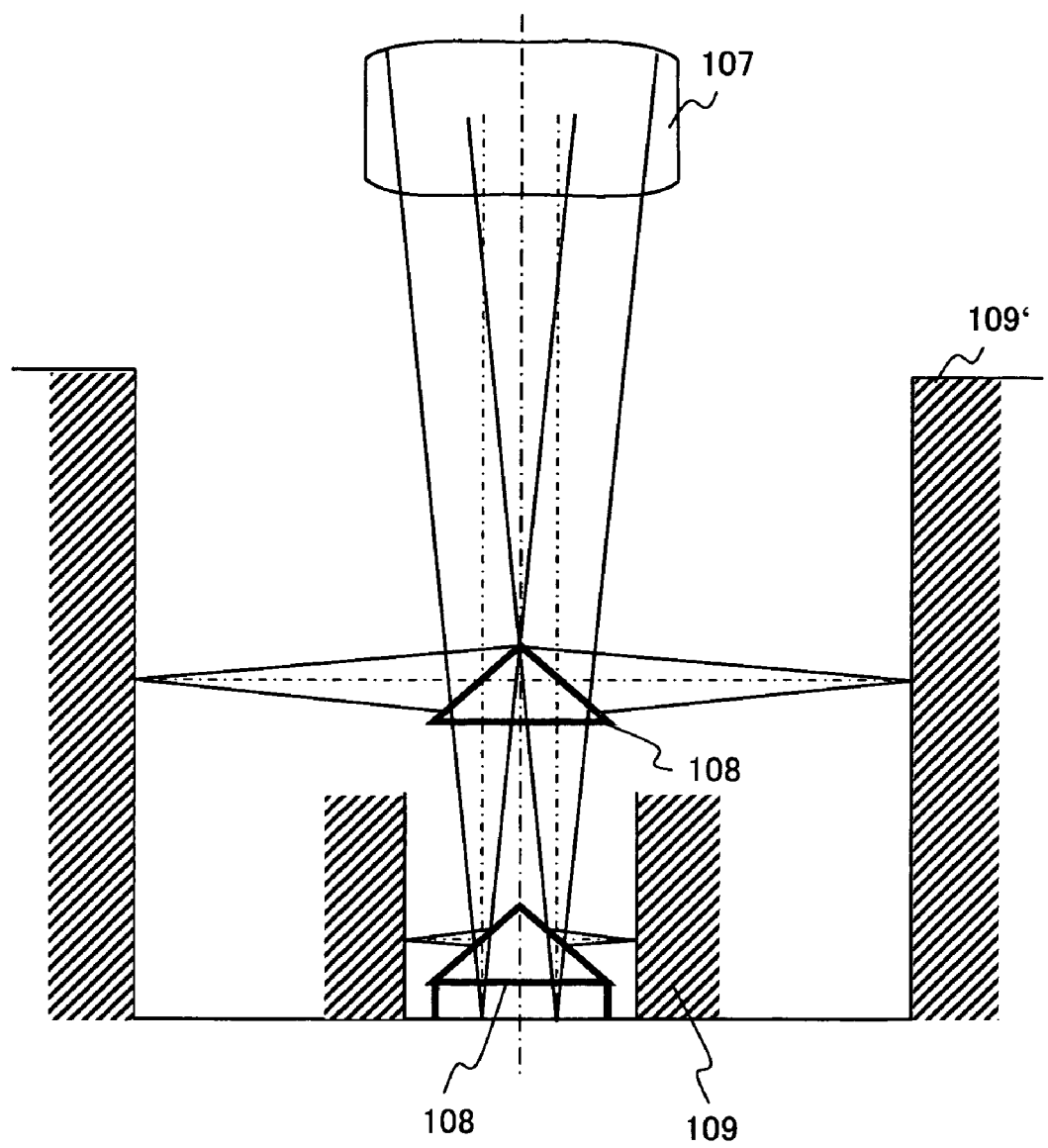
FIG. 8 is an auxiliary diagram for illustrating a hole diameter of a hollow shape of a measuring object.

Here, as shown in FIG. 8, by moving the position of the conical shaped mirror 108 to the lower position shown in FIG. 8, it is possible to change the spacing between the objective lens 107 and the conical shaped mirror 108 and to change the measurement range. In this manner, it is possible to change the measurement range only by adjusting the position of the conical shaped mirror 108 and to utilize the measurement range of the present device to the maximum.

In FIG. 8, the optical ring projected onto the object by the objective lens 107 has a diameter of φ10, and it is possible to measure the hole diameter of φ30 by increasing the above spacing. Further, by decreasing the above spacing, it is possible to measure the hole diameter of φ100. That is, the present device can deal with a large hole diameter such as the measuring object 109' in the drawing.

Note that, since the relationship between the size of the ring image obtained at the imaging part 111 and the inside diameter of the measuring object 109 changes when the position of the conical shaped mirror 108 is changed, calibration is required according to a standard of the measuring object when the position of the conical shaped mirror 108 is changed. Further, the adjustable range of the conical shaped mirror 108 can be obtained from the magnification ratio of the optical system, NA, etc.

Next, measurement flow of the hollow shape measuring device 101 will be described using the flowchart of FIG. 9.

(Step S201) First, the measuring object 109 is set under the movement part 114.

(Step S202) Next, a measurement specification such as a measurement range (movement range) and a measurement pitch (movement pitch) of the movement part 114 is input from the personal computer 115. The measurement specification input from the personal computer 115 is output to the image processing part 112 via a cable 118, and the image processing part 112 instructs the z-axis driving part main body 113 to move the movement part 114 together with the light-sending part 120 and the like to a measurement start position, via the cable 117.

(Step S203) The light-sending part 102 emits light at the present position of the movement part 114, and the imaging part 111 shoots an image.

(Step S204) The imaging part 111 outputs the received image to the image processing part 112 via a cable 116.

(Step S205) The image processing part 112 obtains the inside diameter (shape) of the measuring object 109 as described in FIGS. 5(*a*) and 5(*b*), and FIGS. 6(*a*), 6(*b*), 6(*c*) and 6(*d*).

(Step S206) It is determined whether the measurement is completed or not according to the measurement specification. For, example, if the movement part 114 does not reach the end position of the movement range, the process proceeds to Step S207, and if the movement part 114 reaches the end position, the process proceeds to Step S208.

(Step S207) The movement part 114 is moved to the next measurement position according to the set measurement pitch, and the process returns to Step S203 for the measurement at this position.

(Step S208) When the movement part 114 reaches the end position of the movement range and the measurement is completed, the shape at each inside height (relative position against the measurement optical system) of the measuring object 109 is obtained and the hollow shape data is generated by combining these shapes.

Figure 10:
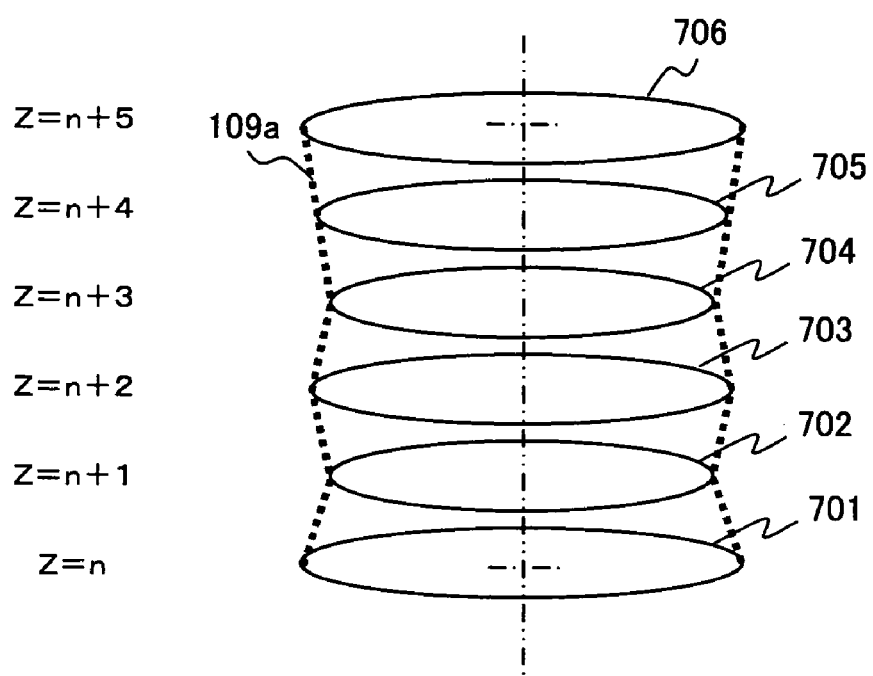
FIG. 10 is an auxiliary diagram for illustrating formation of a hollow shape.

Here, a generation method of the hollow shape data will be described using FIG. 10. In the drawing, Symbols 701 to 706 indicate the inside shapes when the height is changed in the z-axis direction (height direction) from the height (n) to (n+5), respectively, at the predetermined pitch. Note that, while the inside shape is shown as a circle in the drawing for easy understanding, the inside shape becomes a concavo-convex shape having irregular radius depending on the measuring object 109. By combining the inside shapes 701 to 706 at the respective heights, it is possible to obtain the hollow shape data of the measuring object 109 and to form a stereoscopic hollow shape 109*a* from this hollow shape data. Further, the center of the measurement light preferably coincides with the center of the measuring object 109 in the measurement, but, even if there is a shift, it is possible to correct the shift when obtaining the hollow shape data.

Now, description will go back to the flowchart and will be continued.

(Step S209) The hollow shape data generated by the image processing part 112 is output to the personal computer 115 via the cable 118 and displayed on a screen of the personal computer 115.

(Step S210) As needed, the personal computer 115 specifies an optional position of the measuring object 109 displayed on the screen by operation of a keyboard or a mouse, and displays the size or the length of each of the parts specified from the hollow shape data of the measuring object 109 received from the image processing part 112.

(Step S211) All the measurements are completed.

In this manner, by extracting the inside shape of an irradiated part of the measuring object while moving up-and-down the movement part 114 at the predetermined pitch, and by combining these shapes as the inside shapes at the respective predetermined positions, it is possible to measure the hollow shape of the measuring object 109. The measured hollow shape data of the measuring object 109 is transmitted to the personal computer 115 via the cable 118 and the hollow shape of the measuring object 109 can be displayed on the personal computer 115.

Note that, while the present embodiment independently provides the image processing part 112 carrying out the image processing and the personal computer 115 performing the operation of the entire hollow shape measuring device 101 and the display of the measurement result, the personal computer 115 may include the hardware and software of the image processing part 112. Conversely, the image processing part 112 may be provided with an operation part and a display part to function as a dedicated control part of the hollow shape measuring device 101.

In this manner, the hollow shape measuring device 101 according to the present embodiment obtains the inside shape from the shift from the standard hole diameter at each predetermined height of the hollow object and can form the hollow shape of the object 3-dimensionally by combining the measured inside shapes at the respective predetermined positions while changing the height. In particular, since the inside shape is obtained from the shift from the standard hole diameter, the configuration is simple and it is not necessary to carry out complicated computation. Further, while a moire method, which obtains all the contour lines at one time, has a problem that error becomes larger according to the height difference in the object, the hollow shape measuring device and measurement method according to the present embodiment obtains the inside shape at each height and can carry out a highly accurate measurement without depending on the height difference in the object. Further, the present measuring device and measurement method can obtain the inside shape of the whole circumference by one time shooting and thereby can carry out the three-dimensional measurement in an extremely high speed compared to the conventional three-dimensional measurement by the sensing pin method.

Note that, while the present embodiment employs the method of shading a half of the light flux irradiating the measuring object 109 using the optical limiting slit 104, it is optional, without using the optical limiting slit 104, to provide a drive stage which moves the measuring object 109 and the conical shaped mirror 108 relatively in a direction orthogonal to the z-axis, along which the z-axis driving part main body 113 moves the movement part 114, and to move the drive stage in the direction orthogonal to the z-axis only by a small distance when carrying out the measurement at the predetermined position, and thereby to obtain the inside shape of the measuring object 109 from the direction of the drive stage movement, the light broadening amount (magnitude of the image blur), and the shift from the standard hole diameter. For example, when the drive stage is moved toward the inside of the measuring object 109, that is, the conical shaped mirror 108 is made closer to a part of the measuring object 109, if the light broadening amount increases, the hole diameter of the measuring object 109 is determined to be smaller than the standard hole diameter at the part, and, on the other hand, if the light broadening amount decreases, the hole diameter of the measuring object 109 is determined to be larger than the standard hole diameter. Alternatively, when the drive stage is moved in the direction apart from the inside of the measuring object 109, if the light broadening amount increases, the hole diameter of the measuring object 109 is determined to be larger than the standard hole diameter, and, on the other hand, if the light broadening amount decreases, the hole diameter of the measuring object 109 is determined to be smaller than the standard hole diameter.

Further, while the present embodiment employs the method of supporting the conical shaped mirror 108 with the colorless transparent movement part 114, the movement part 114 does not need to be colorless and transparent if the movement part 114 is provided with an opening part at its periphery. Further, since the center portions of the conical shaped mirror 108, the objective lens 107, and the half mirror 106 are not used for the light path, it is possible to build a support rod at this portion to support the conical shaped mirror 108 and the like.

Second Embodiment

Figure 11:
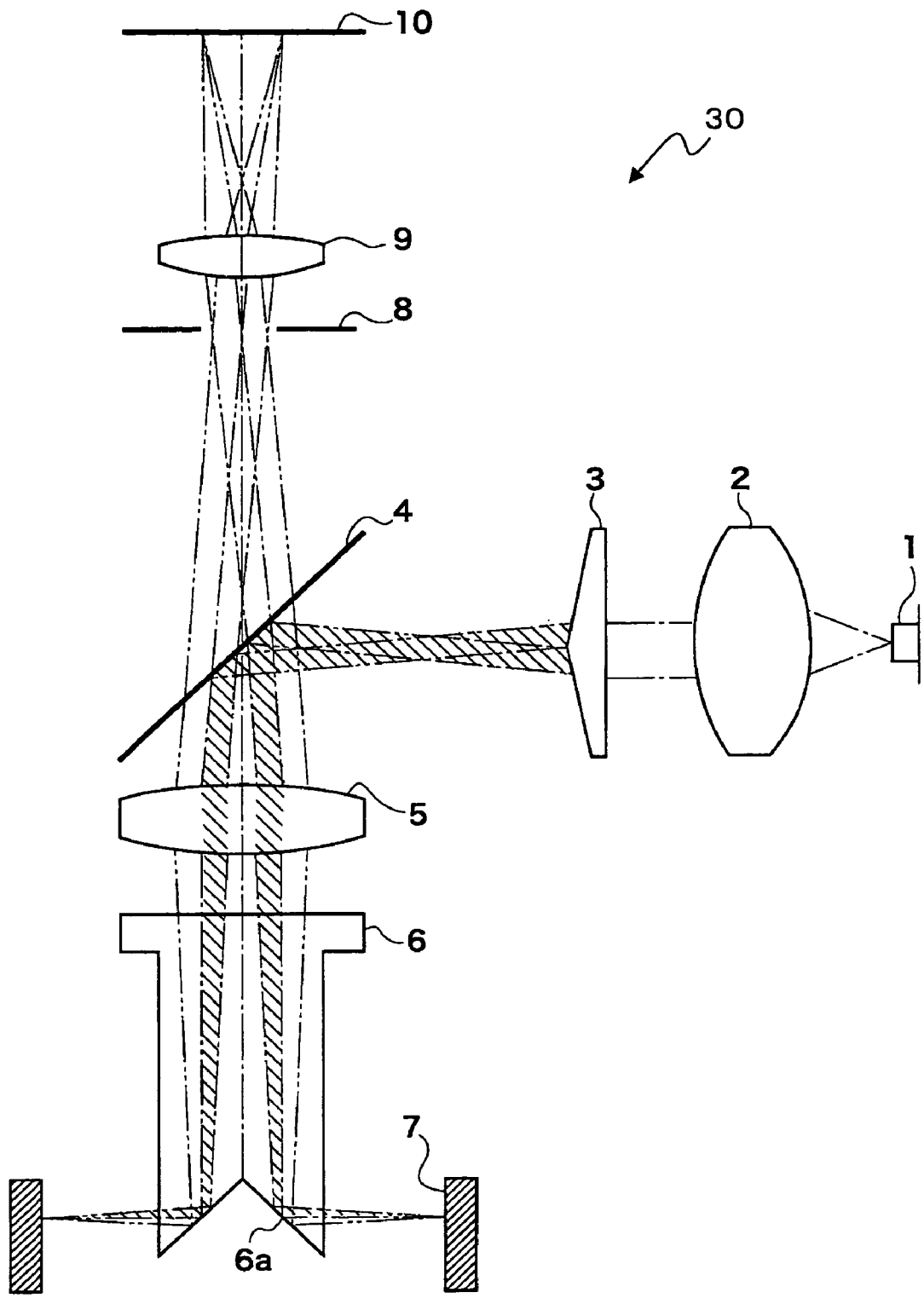
FIG. 11 is a diagram showing an outline of an optical system in a hollow shape measuring device 30 according to a second embodiment of the present invention.

Hereinafter, an example of a second embodiment will be described using drawings. FIG. 11 is a diagram showing an outline of an optical system in a hollow shape measuring device 30 according to the second embodiment of the present invention. Illumination light from a light source 1 is condensed by a collector lens 2, and approximately parallel light flux enters an axicon lens 3, which has a conical shaped output surface for forming ring-shaped light, from the bottom direction thereof. The center of the above illumination light approximately coincides with the center axis of the axicon lens 3 and a parallel light flux is formed spreading in a ring shape by refraction at the conical surface. This light flux is reflected by a sending and receiving light branch mirror 4 (half mirror, or half prism which can be used instead of the half mirror) and condensed by an objective lens 5 to become a fine ring-shaped light.

The axicon lens 3 is disposed so that the top of the cone may coincide with a focus of the objective lens 5. By the disposition in this manner, the light ray having been transmitted through the center of the cone passes through the pupil center of the objective lens 5 and travels in parallel to the light axis of the objective lens 5 after having been transmitted through the objective lens 5. Further, the conical surface of the axicon lens 3 refracts the illumination light and thereby forms the ring-shaped light, the radius of which is equal to a product of this refraction angle and the focal length of the objective lens 5. Further, the light having entered the conical surface of the axicon lens 3 keeps a parallel light flux even after the refraction and thereby is condensed at the object side focal position of the objective lens 5.

The ring light enters a cylindrical optical material 6 (light transmissive material) having a conically hollowed reflection part 6a at an end surface, such that the main light ray does not become parallel to the center axis (which coincides with the center axis of the cylinder) of the above cone. That is, the light ray of the ring light flux at the middle position in the ring width does not become parallel to the light axis. Then, the ring light is reflected orthogonally at the conical shaped reflection part 6a to be output from the cylinder surface and forms an image on a circumference spaced apart by a predetermined distance. Note that the whole shape of the optical material 6 does not need to be cylindrical, if the surface outputting the light reflected from the reflection part 6a is cylindrical. Further, the light entering surface is a plane perpendicular to the center axis of the above cone.

Here, the reflection part 6a may have the same shape as that of the conical shaped mirror 108 explained in FIGS. 3(*a*), 3(*b*) and 3(*c*) of the first embodiment. Conversely, the conical shaped mirror 108 of the first embodiment may have the same shape as that of the reflection part 6a of the present embodiment and may include the cylindrical optical material 6.

The light flux forming the above described ring light is reflected by a hollow shape inside wall 7, reflected again by the reflection part 6a, transmitted through the sending and receiving light branch mirror 4 via the cylindrical optical material 6 and the objective lens 5, and further transmitted through an aperture stop 8, and then forms an image of the reflected light from a measuring object 7 on an imaging surface 10 via an image formation lens 9. The aperture stop 8 is provided with a circular opening having a size conjugate with the pupil of the illumination light flux at a position conjugate with the pupil of the illumination light flux.

The principle of measuring the hollow space will be described using FIG. 12. In the following drawings, in principle, the same constituent as that shown in the previous drawing is denoted by the same symbol and description thereof will be omitted.

Figure 12:
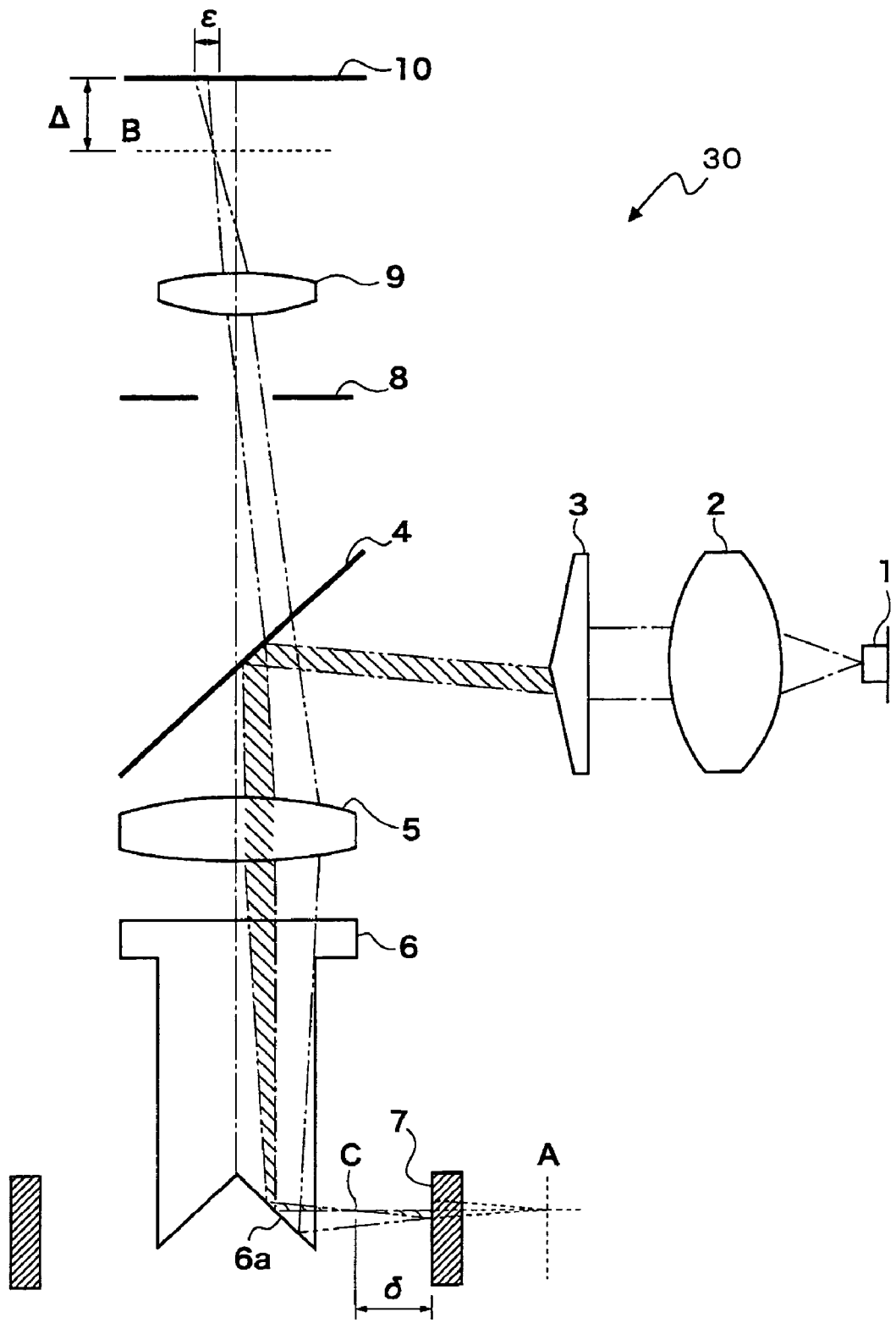
FIG. 12 is a diagram for illustrating a principle of hollow shape measurement in the second embodiment of the present invention.

For easy understanding, only one side of the ring light is shown in FIG. 12. FIG. 12 shows a case in which the hole diameter is larger than the image formation position of the ring light. The illumination light flux is once minimized at the ring light image formation position C and is broadening to irradiate the hollow space inside wall 7 of the measuring object. The light flux reflected by the hollow space inside wall 7 is guided to a light receiving optical system configured with the objective lens 5, the sending and receiving light branch mirror 4, the aperture stop 8 and the image formation lens 9 via the reflection part 6a and the optical material 6, and an image of this light flux is formed at a plane B before the imaging surface 10 as if the light receiving optical system receives the light flux emitted from a plane A. Thereby, the light flux is observed to be broadened at the imaging surface 10.

When the magnification ratio of the light receiving optical system is $\beta$ and the distance from the ring light image formation position C to the hollow shape inside wall 7 is $\delta$, the distance $\Delta$ from the image sensor 10 to the image formation plane B is expressed as follows.

$$\Delta = 2\beta^2\delta \quad (1)$$

The ring light image broadening amount $\epsilon$ in the radial direction is equal to the distance $\Delta$ from the image sensor 10 to the image formation plane B multiplied by a numerical aperture of the imaging side, since the ring light image broadens only on one side. When a numerical aperture of the illumination light is NA, the ring light image broadening amount $\epsilon$ is given as follows.

$$\varepsilon = \Delta \frac{NA}{\beta} \quad (2)$$
$$= 2 \cdot \beta \cdot NA \cdot \delta$$

Thereby, it is possible to obtain the distance $\delta$ from the ring light image formation position C to the hollow shape inside wall 7 from the ring light image broadening amount $\epsilon$ in the radial direction. Further, it is possible to determine whether the hole diameter is smaller or larger than the ring light image formation position, from the direction of the broadening. That is, when the ring light image broadens to the outside of a predetermined position on the imaging surface 10 conjugate with the ring light image formation position, the hole diameter is larger than the ring light image formation position, and when the ring light image broadens to the inside of the predetermined position, the hole diameter is smaller than the ring light image formation position. Here, the radial broadening of the ring light image can be considered in the same way as in FIG. 5(b) and FIGS. 6(a), (b), (c) and (d) of the first embodiment, and the ring light image broadens to the outside as the hole diameter becomes larger than the ring light image formation position (standard hole diameter), and the ring light image broadens to the inside as the hole diameter becomes smaller than the standard hole diameter. Further, the ides of above Formula (2) can be applied also to the first embodiment. Note that while the present embodiment has been explained using a continuous ring light flux as the ring light flux, the ring light flux may be discontinuous (periodic).

Since the ring light is projected in the circumference direction inside the hollow shape, by measuring the broadening of the ring-shaped light image within the imaging surface, it is possible to obtain the distance from the ring light image formation position C to the hollow shape inside wall 7 in each direction for the whole circumference direction. Since the distance from the ring light image formation position C to the center axis of the above cone (which coincides with the center axis of the cylinder) is known and fixed if the disposition of the optical systems 1 to 6 are not changed, it is also possible to obtain the distance from the center axis of the above cone (which coincides with the center axis of the cylinder) to the hollow shape inside wall 7 in the whole circumference direction and to obtain the shape of the hollow shape (cross-sectional shape vertical to the center axis of the above cone).

Note that it is not always necessary to dispose the top of the cone of the axicon lens 3 to coincide with the focus of objective lens 5, if the ring light is formed such that the light ray of the ring light flux at the middle position of the ring width is not parallel to the light axis. When the hole diameter is larger than the ring light image formation position, the ring light image broadens to the inside as well as to the outside of the predetermined position on the imaging surface 10 conjugate with the ring light image formation position, but the broadening amount is larger in the outside. On the other hand, when the hole diameter is smaller than the ring light image formation position, the ring light image broadens to the outside as well as to the inside of the predetermined position on the imaging surface 10 conjugate with the ring light image formation position, but the broadening amount is larger in the inside. Therefore, it is possible to determine whether the hole diameter is larger or smaller than the ring light image formation position, from both of the broadening amount and the broadening direction.

Figure 13:
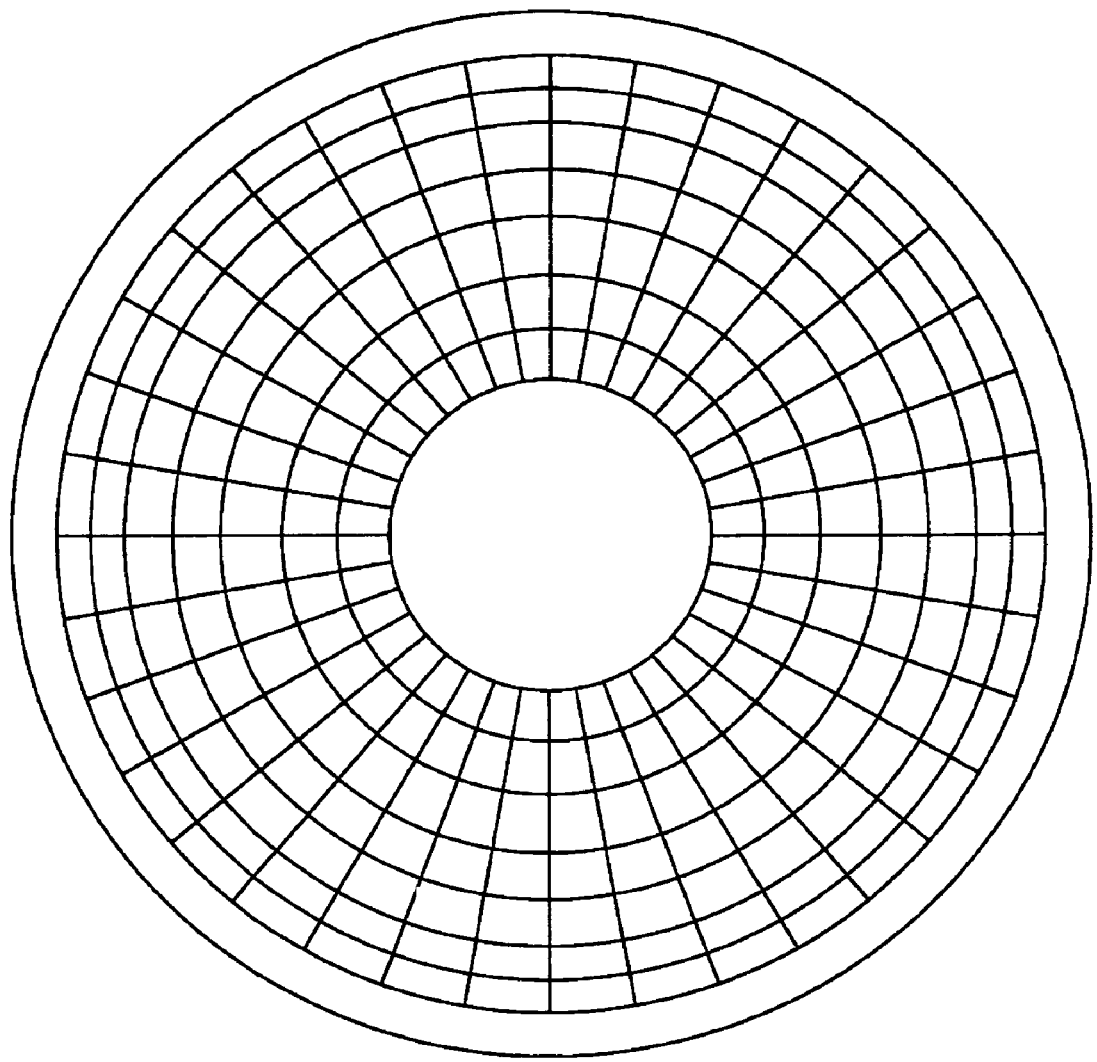
FIG. 13 is a diagram showing an example of an image sensor suitable for the hollow shape measuring device 30 which is an embodiment of the present invention.
Figure 14:
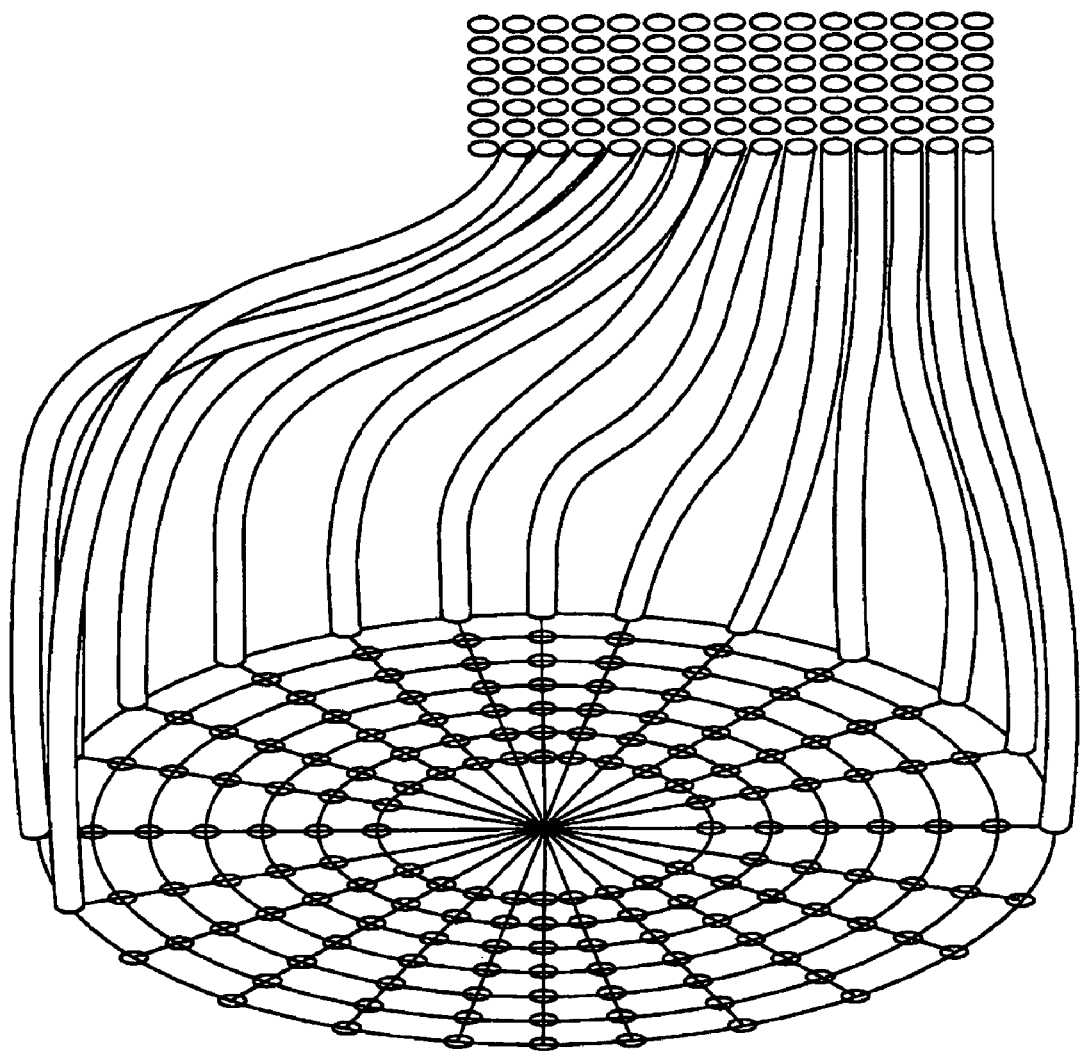
FIG. 14 is a diagram showing an example of an imaging part suitable for the hollow shape measuring device 30 which is an embodiment of the present invention.

The distance from the ring light image formation position to the hollow shape inside wall 7 in any direction may be obtained by signal processing using a conventional CCD or CMOS element, which has pixels arranged in a grid pattern, for the image sensor 10, but by using the image sensor which has pixels arranged radially as shown in FIG. 13 or the image sensor in which optical fibers are arranged radially at the incident side and rearranged according to the pixel arrangement of a two dimensional image sensor at the output side as shown in FIG. 14, it is possible to carry out the highly accurate measurement at a high speed because conversion from two dimensional coordinates to a cylindrical coordinate system is not necessary.

Note that the configuration examples of the image sensor shown in FIG. 13 and FIG. 14 can be applied to the imaging part 111 of the hollow shape measuring device 101 according to the first embodiment.

Further, the broadening amount of the light flux becomes larger as defocus amount is increased, and a signal from the edge part of a beam tends to be embedded in noise and the detection of the beam edge easily has an error. Therefore, by subjecting the light source 1 to strength modulation using an LED or the like, the output from each pixel of the image sensor may be detected synchronously.

For obtaining the shape of the hollow shape inside wall 7, by moving the entire optical system in the direction of the center axis in the above described cone and by repeating the measurement of the distance in the whole circumference direction while shifting the position irradiated with the ring light, it is possible to obtain the distance to the hollow shape inside wall 7 in each direction and to obtain the shape data in the cylindrical coordinates.

Figure 9:
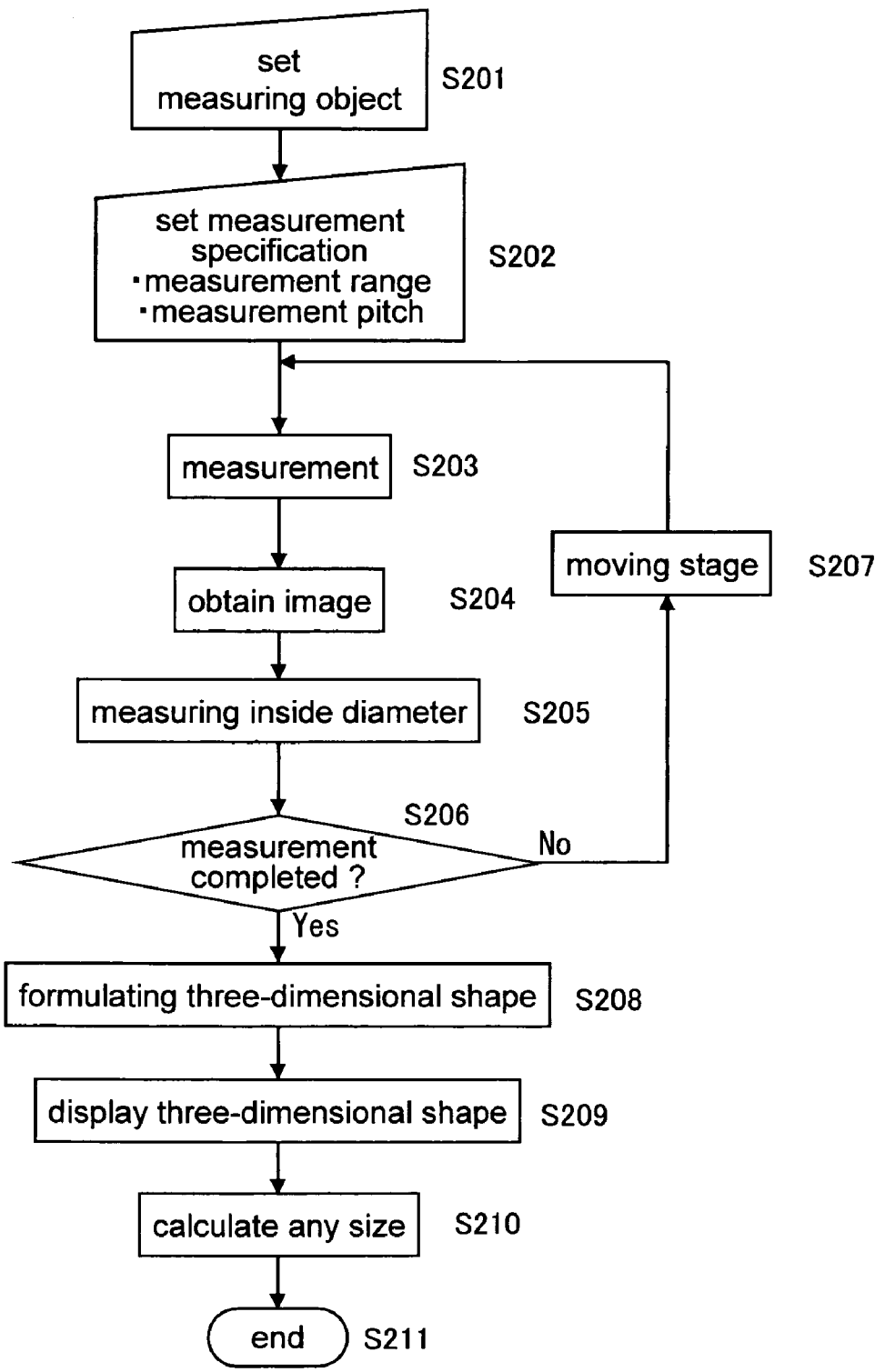
FIG. 9 is a flowchart showing a measurement procedure of the hollow shape measuring device 101.

Here, measurement processing of the hollow shape measuring device 30 according to the present embodiment can be realized by a similar processing to the processing of the flowchart in FIG. 9 of the first embodiment using the image processing part 112 and the personal computer 115.

Figure 15:
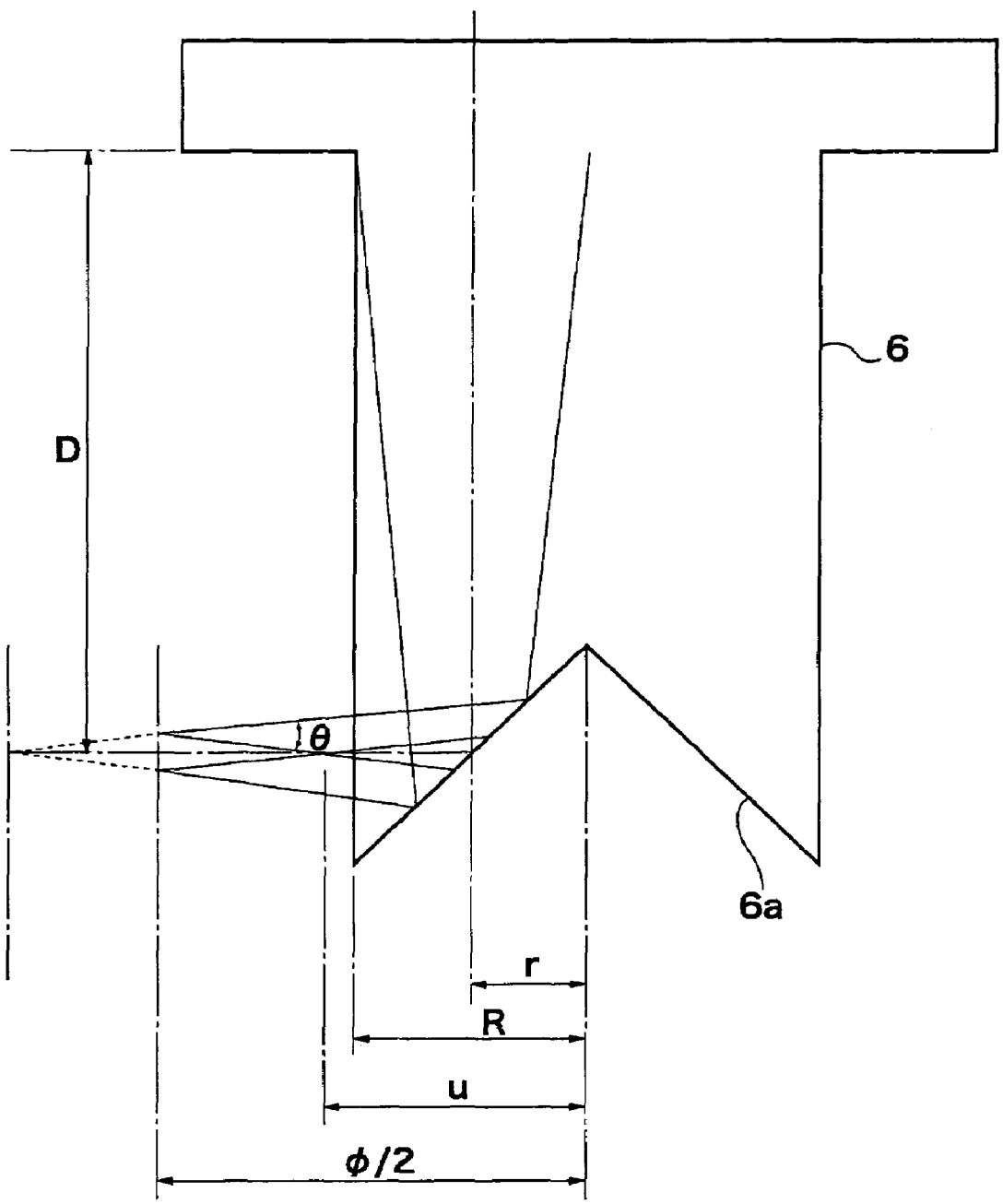
FIG. 15 is a diagram showing an example of a light transmissive material used in an embodiment of the present invention.

FIG. 15 shows the cylindrical optical material 6, and a condition thereof for available measurement will be discussed in the following. When the radius of the cylindrical portion of the cylindrical material is R and the radius of main light ray of the ring light is r, the cylinder diameter needs to be larger than the light flux diameter at the incident side on the upper side of the cylindrical material 6 shown in FIG. 15 in order for the light, which is broadening from the temporary emission center A shown in FIG. 12 at an angle θ, to enter the objective lens 5 without kicking the light off. When the ring light image formation position exists having a radius u from the center axis of the cylinder, the hollow shape inside diameter φ of the measuring object needs to satisfy the next condition for the measurement up to the depth D. Here, n indicates the refractive index of the cylindrical material.

$$\phi < u + \left(\frac{1}{\sin\theta} - \frac{1}{n} + 1\right)R - \left(\frac{1}{\sin\theta} - \frac{1}{n}\right)r - \frac{D}{n} \quad (3)$$

In a case of the ring light having the radius r=8 mm and sin θ=0.1 by using the optical material 6 having the measurement length D of 100 mm, the cylindrical portion radius R of 20 mm, and the refractive index of 1.8, it is possible to measure the inside diameter up to 99.7 mm when the ring light image formation position is located at 22 mm from the center axis of the cylinder.

Third Embodiment

Next, a hollow shape measuring device 31 according to a third embodiment will be described. The hollow shape measuring device 31 cannot always realize a higher speed measurement, but also can measure the distance in the whole circumference direction by confocal observation using the optical material of the embodiments of the present invention. FIGS. 16(a) and 16(b) show a configuration example of the hollow shape measuring device 31 according to the third embodiment. The constituent shown in FIGS. 16(a) and 16(b) have the same configuration as that of the constituent in the hollow shape measuring device 30 shown in FIG. 11 and FIG. 12 unless particular explanation is added.

The illumination light emitted from a light source 11 illuminates a pinhole 13 via a collector lens 12. The light having been transmitted through the pinhole 13 is formed into an approximately parallel light flux by a condenser lens 14 and enters an axicon lens 15 for forming ring light. The illumination light is converted into the parallel ring-shaped light flux by the axicon lens 15 as described above and reflected by a sending and receiving light branch mirror 16 to be guided to an objective lens 17. The illumination light is converted by the objective lens 17 into a light flux condensing telecentrically in a ring shape, enters an optical material 18, and is converted into a light flux spreading in a plane perpendicular to a light axis of the objective lens 17, and then irradiated onto a hollow shape inside wall 19 of a measuring object.

The light reflected by the hollow shape inside wall 19 enters again into the optical material 18 and is guided to a light receiving optical system via the objective lens 17 and the sending and receiving light branch mirror 16. The light receiving optical system transmits only normally reflected light with an aperture stop 20, condenses the light from the hollow shape inside wall 19 with an image formation lens 21, and forms an image on a ring slit 22. Since the ring slit 22 is disposed at a conjugate image position (i.e., position conjugate with a position where the broadening of the ring-shaped light flux in the moving radial direction is minimized), the optical amount being transmitted through the ring slit 22 is maximized when the hollow shape inside wall 19 coincides with an image formation position of the illumination ring light image.

The light having been transmitted through the ring slit 22 is projected to an imaging surface 24 by an image relay lens 23. Since a ring-shaped image is formed at a position of a diameter, which is equal to a main light ray diameter of the ring light projected onto the object multiplied by a total magnification ratio of the light receiving optical system, on the imaging surface 24, optical amount in the circumference direction thereof is monitored with an image sensor 24 as shown in FIG. 16(b). The optical system enclosed by a dotted line in FIG. 16(a) can be moved along the light axis of the objective lens 17 independently from the optical material 18, and it is possible to change the image formation position of the illumination ring light by changing the spacing between the optical material 18 and the objective lens 17. That is, from the spacing between the optical material 18 and the optical system, which maximizes the optical amount received by each pixel of the imaging surface 24, it is possible to detect the position of the hollow shape inside wall 19 for each circumference direction corresponding to each pixel, by moving the optical system along the light axis of the objective lens 17 while fixing the optical material 18. Thereby, it is possible to obtain the shape of the hollow shape in the circumference direction. For obtaining the shape of the hollow shape, it is necessary to obtain diameter data by moving the optical system in a similar manner to scan the measurement range after having further moved the optical material 18.

As described hereinabove in each of the embodiments, the measuring device and measuring method can measure an inside shape of a hollow measuring object, with a simple configuration and without carrying out a complicated computation.

In particular, the measuring device and measuring method can carry out the distance measurement of the hollow shape in the whole circumference direction at the same time, and, since the distance measurement is carried out in the direction of a main light ray in a light flux and thereby can be performed in a uniform accuracy compared to a method such as one observing the object in an oblique direction, it is possible to carry out the hollow shape measurement highly accurately at a high speed.

Further, it is possible to support the reflection part with the optical transmission part by employing internal reflection in an optical material to the reflection part which refracts the light flux in a radial direction inside the hollow shape, and to remove a rod of a metal part shading the light.

Still further, it is possible to make the optical transmission part stronger by embedding the part into light transmissive material such as glass or plastic than by supporting the part with the fine rod of a metal part. Thereby, the optical transmission part is resistant to the effect of an accident such as clash against the measuring object in the measurement, which results in improving workability.

Moreover, since the light transmissive material has a higher refractive index than air, the light flux broadening becomes smaller by an amount of the refractive index difference at a position apart in the same distance even for the light with the same numerical aperture, and thereby it is possible to measure a deeper hollow shape.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A measuring device measuring an inside shape of a hollow measuring object, comprising:
    a light-sending part configured to send light in a first direction which is a depth direction of the hollow shape;
    a conversion part configured to convert a direction of the light into a direction approximately orthogonal to the first direction;
    a detection part configured to detect the light reflected inside the measuring object, the direction of which is converted by the conversion part;
    an optical part configured to form an inside image of the measuring object; and
    a shape measurement part configured to measure the inside shape of the measuring object by obtaining difference between a position of an inner surface of the measuring object and a predetermined reference position according to a detection result of the detection part, wherein
    the predetermined reference position is in conjugate relationship with the detection part due to the optical part.

2. The measuring device according to claim 1, further comprising
    a movement part configured to move a measurement optical system including the light-sending part, the conversion part, the detection part, and the optical part, and the measuring object relatively in the first direction, wherein
    the shape measurement part measures the inside shape of the measuring object according to the detection result of the detection part when relative positions of the measuring object and the conversion part are changed.

3. The measuring device according to claim 1, wherein
    the conversion part converts the direction of the light sent by the light-sending part toward the position of the inner surface of the measuring object in the direction approximately orthogonal to the first direction.

4. The measuring device according to claim 1, further comprising:
    the light-sending part includes a light source generating the light, a first optical limiting material having an aperture of a predetermined shape, a first optical system configured to guide the light from the light source and having a conjugate position relative to the first optical limiting material at the predetermined reference position, and a second optical system causing the light returned from the measuring object to form an image; and
    a light receiving part includes the detection part being disposed at an imaging surface where an image of the measuring object at the reference position is formed by the second optical system, receives the light from the light source, and has a conjugate relation with the reference position.

5. The measuring device according to claim 4, further comprising
    a second optical limiting material having an aperture of a predetermined shape and shading a part of a light flux which is irradiated to the measuring object from the first optical limiting material.

6. The measuring device according to claim 4, wherein
    the first optical limiting material is configured with a round slit.

7. The measuring device according to claim 1, further comprising:
    the light-sending part includes a light source generating the light, a first optical system guiding the light from the light source and having a focus at the reference position, and an optical material converting the light from the light source into ring-shaped light and condensing the light onto a predetermined position, a ring light flux generating optical system, such that a light ray at a middle position of a ring width in the ring light flux does not become parallel to a light axis of an optical system configured with the optical material, and
    a second optical system configured to cause the light returned from the measuring object to form an image; and
    a light receiving part includes the detection part being disposed at an imaging surface where an image of the measuring object at the reference position is formed by the second optical system, receives the light from the light source, and has a conjugate relation with the reference position.

8. The measuring device according to claim 1, further comprising:
    the light-sending part includes a light source generating the light, a first optical system guiding the light from the light source and having a focus at the reference position, and an optical material converting the light from the light source into ring-shaped light and condensing the light onto a predetermined position, a ring light flux generating optical system, such that a light ray at a middle position of a ring width in the ring light flux does not become parallel to a light axis of an optical system configured with the optical material, and
    a second optical system configured to cause the light returned from the measuring object to form an image; and
    a light receiving part includes the detection part being disposed at an imaging surface where an image of the measuring object at the reference position is formed by the second optical system, receives the light from the light source via a ring-shaped slit, and has a conjugate relation with the reference position, and
    a movement part configured to change a spacing between the conversion part and the other optical system and also measuring the spacing, in a state of fixing the conversion part.

9. The measuring device according to claim 7, wherein
    the ring light flux generating optical system includes a collector lens configured to form the light from the light source into parallel light and an axicon lens configured to convert the parallel light into the ring-shaped light flux.

10. The measuring device according to claim 1, wherein
    the light-sending part is disposed at the position configured to send the light in the direction different from the first direction, and a half mirror is provided between the measuring object and the light-sending part to reflect the light sent from the light-sending part in the first direction and also to transmit the light returned from the measuring object to the light receiving part side.

11. The measuring device according to claim 1, wherein the conversion part is configured with a conical shaped mirror.

12. The measuring device according to claim 1, wherein the conversion part performs reflection by total reflection.

13. The measuring device according to claim 1, wherein the conversion part has a reflection part formed in a light transmissive material.

14. A measuring method measuring an inside shape of a hollow measuring object, comprising:

converting a direction of light sent by a light-sending part in a first direction into a circumference direction approximately orthogonal to the first direction by a conversion part and irradiating an inside of the measuring object with the light;

forming an image on a detection part using the light reflected by an inner surface of the measuring object and converting a direction of the light to the first direction, the detection part being placed at a position conjugate with the predetermined reference position; and measuring an inside shape of the measuring object by obtaining a shift of an inner surface of the measuring object from a predetermined reference position according to a detection result of the light reflected inside the measuring object by the detection part.

15. The measuring method according to claim 14, comprising measuring the inside shape of the measuring object by performing the detection while moving the measuring object and the conversion part relatively in the first direction.

* * * * *